US012613607B2

(12) United States Patent
Zhang et al.

(10) Patent No.: US 12,613,607 B2
(45) Date of Patent: Apr. 28, 2026

(54) INFORMATION DISPLAYING METHOD AND DEVICE

(71) Applicant: BEIJING YOUZHUJU NETWORK TECHNOLOGY CO. LTD., Beijing (CN)

(72) Inventors: Bo Zhang, Beijing (CN); Yanhao Li, Beijing (CN); Kejian Shi, Beijing (CN); Xuhui Xu, Beijing (CN); Jindong Zhou, Beijing (CN)

(73) Assignee: BEIJING YOUZHUJU NETWORK TECHNOLOGY CO. LTD., Beijing (CN)

( * ) Notice: Subject to any disclaimer, the term of this patent is extended or adjusted under 35 U.S.C. 154(b) by 145 days.

(21) Appl. No.: 18/548,254

(22) PCT Filed: Apr. 7, 2022

(86) PCT No.: PCT/CN2022/085497
§ 371 (c)(1),
(2) Date: Aug. 29, 2023

(87) PCT Pub. No.: WO2022/228070
PCT Pub. Date: Nov. 3, 2022

(65) Prior Publication Data
US 2024/0192824 A1 Jun. 13, 2024

(30) Foreign Application Priority Data

Apr. 30, 2021 (CN) .......................... 202110485703.8

(51) Int. Cl.
*G06F 3/048* (2013.01)
*G06F 3/0481* (2022.01)
(Continued)

(52) U.S. Cl.
CPC ........ *G06F 3/0481* (2013.01); *G06F 3/04842* (2013.01); *G06F 3/04845* (2013.01)

(58) Field of Classification Search
CPC .......................... G06F 3/0481; G06F 3/04842
See application file for complete search history.

(56) References Cited

U.S. PATENT DOCUMENTS 9,292,481 B2 * 3/2016 Mangini .............. G06Q 10/103
10,712,918 B2 * 7/2020 Kim ...................... G06F 1/1641
(Continued)

FOREIGN PATENT DOCUMENTS

CN 107423344 A 12/2017
CN 110097099 A 8/2019
(Continued)

OTHER PUBLICATIONS

China National Intellectual Property Administration, Notice of Rejection Issued in Application No. 202110485703.8, Jan. 20, 2023, 8 pages. Submitted with partial English translation.
(Continued)

*Primary Examiner* — David Phantana-angkool
(74) *Attorney, Agent, or Firm* — Alleman Hall LLP

(57) ABSTRACT

Embodiments of the present disclosure provide an information displaying method and device, and the method includes: displaying a quadrant diagram and multiple scatter points distributed in the quadrant diagram in a first area of a data analysis interface, where different scatter points correspond to different objects, and a coordinate of a scatter point in the quadrant diagram reflects performance of an object corresponding to the scatter point in terms of multiple indicators; and displaying an identification of the object corresponding to the scatter point in the quadrant diagram in a second area of the data analysis interface. Therefore, display of performance about multiple objects in multiple dimensions is
(Continued)

Scaling icon achieved, thus improving the display effect, as well as an interaction efficiency between a user and a terminal.

19 Claims, 14 Drawing Sheets

(51) Int. Cl.
    G06F 3/04842 (2022.01)
    G06F 3/04845 (2022.01)

(56) References Cited

U.S. PATENT DOCUMENTS

| | | | | |
|---|---|---|---|---|
| 12,159,116 | B1 * | 12/2024 | Srinivasan | G06T 11/206 |
| 2007/0282667 | A1 * | 12/2007 | Cereghini | G06Q 30/0206 |
| | | | | 705/7.35 |
| 2013/0132814 | A1 * | 5/2013 | Mangini | G06F 40/169 |
| | | | | 709/201 |
| 2015/0067566 | A1 | 3/2015 | Baarz et al. | |
| 2015/0227298 | A1 * | 8/2015 | Kim | G06F 1/1652 |
| | | | | 715/799 |
| 2016/0042081 | A1 * | 2/2016 | Baker | G06F 16/9538 |
| | | | | 715/747 |
| 2019/0121537 | A1 * | 4/2019 | Wu | G06F 3/04883 |
| 2021/0224261 | A1 * | 7/2021 | Beausoleil | H04L 12/1822 |
| 2023/0153722 | A1 * | 5/2023 | Simpson | G06Q 40/04 |
| | | | | 701/410 |
| 2023/0252382 | A1 * | 8/2023 | Simpson | G06Q 50/02 |
| | | | | 701/410 |
| 2024/0192824 | A1 * | 6/2024 | Zhang | G06T 11/206 |

FOREIGN PATENT DOCUMENTS

| | | |
|---|---|---|
| CN | 112138390 A | 12/2020 |
| CN | 112200612 A | 1/2021 |
| CN | 113204320 A | 8/2021 |
| JP | 2021019954 A | 2/2021 |

OTHER PUBLICATIONS

China National Intellectual Property Administration, Office Action and Search Report Issued in Application No. 202110485703.8, Oct. 19, 2022, 21 pages.

Zhiyong, X., "Scatterplot," Baidu, Available Online at https://bkso.baidu.com/item//10065276, Retrieved on Aug. 9, 2023, 7 of pages.

China National Intellectual Property Administration, International Search Report and Written Opinion Issued in Application No. PCT/CN2022/085497, Jun. 16, 2022, WIPO, 15 pages.

Bei, L. et al., "Chapter 4 Project Portfolio," Project Strategy Portfolio Design, Higher Education Institutions International Business and Trade Major Curriculum Planning Textbook, Apr. 17, 2011, 33 pages.

China National Intellectual Property Administration, Reexamination Notice Issued in Application No. 202110485703.8, Dec. 26, 2025, 16 pages.

* cited by examiner

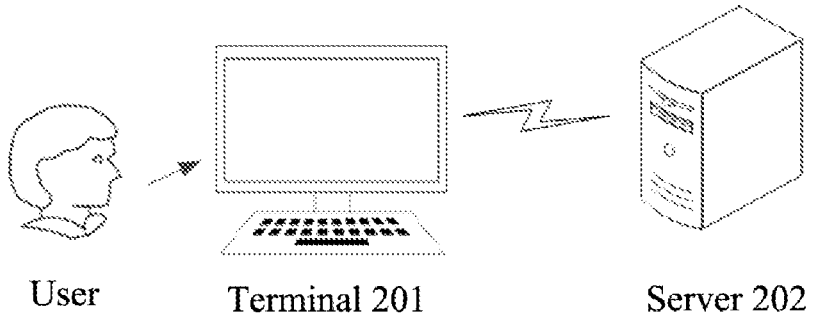

User        Terminal 201        Server 202

FIG. 2

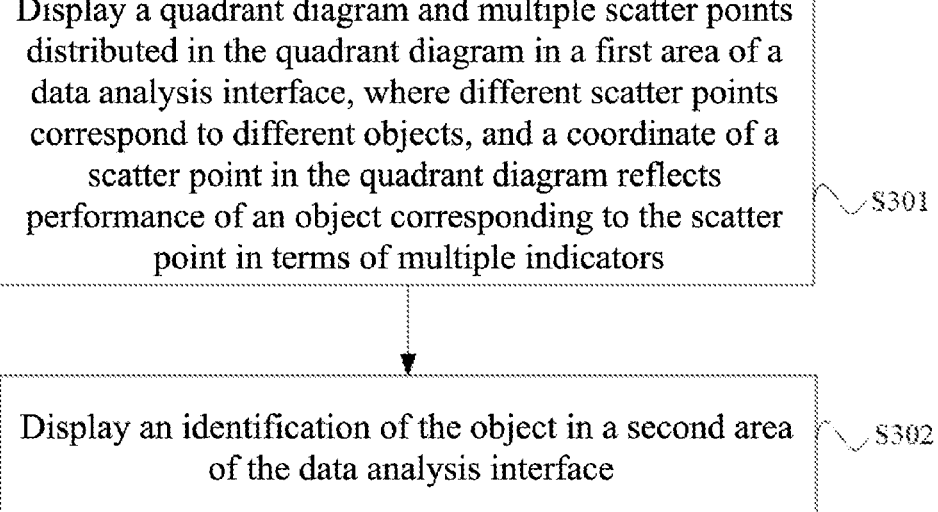

Display a quadrant diagram and multiple scatter points distributed in the quadrant diagram in a first area of a data analysis interface, where different scatter points correspond to different objects, and a coordinate of a scatter point in the quadrant diagram reflects performance of an object corresponding to the scatter point in terms of multiple indicators — S301

Display an identification of the object in a second area of the data analysis interface — S302

FIG. 3

Data analysis
interface

Display a quadrant diagram and multiple scatter points distributed in the quadrant diagram in a first area of a data analysis interface, where different scatter points correspond to different objects, and a coordinate of a scatter point in the quadrant diagram reflects performance of an object corresponding to the scatter point in terms of multiple indicators ⟍ S501

Display an identification of the object in a second area of the data analysis interface ⟍ S502

Display multi-dimensional attribute information of an object corresponding to a scatter point selected by a user in response to a selection operation of the user for the scatter point ⟍ S503

FIG. 5

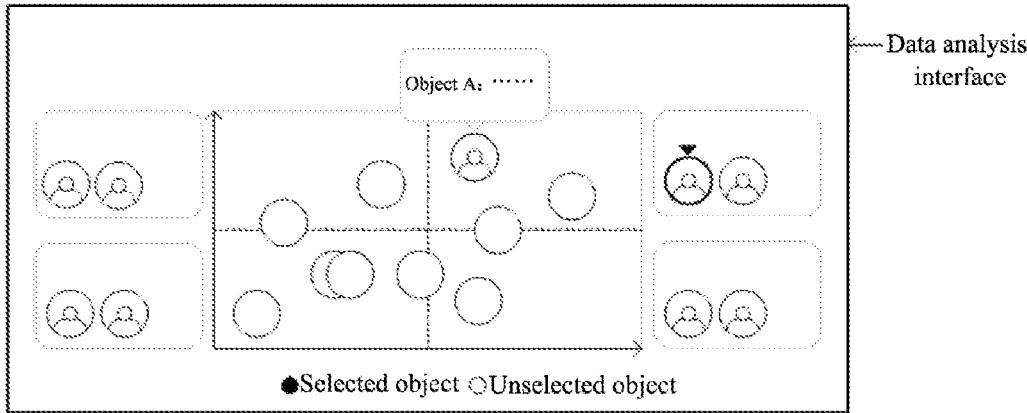

Object A: ......

●Selected object ○Unselected object

←Data analysis interface

FIG. 6a

INFORMATION DISPLAYING METHOD AND DEVICE

CROSS-REFERENCE TO RELATED APPLICATIONS

This application is a national stage of International Application No. PCT/CN2022/085497, filed on Apr. 7, 2022, which claims priority to Chinese patent application No. 202110485703.8, filed on Apr. 30, 2021. Both of the aforementioned applications are hereby incorporated by reference in their entireties

TECHNICAL FIELD

Embodiments of the present disclosure relate to the field of computer and network communication technologies and, in particular, to an information displaying method and device.

BACKGROUND

With the development of technologies such as big data analysis, front-end development and the like, the big data analysis can be conducted on a target object in multiple dimensions to get performance of the target object in the multiple dimensions, and the performance of an object in the multiple dimensions can be displayed through the front-end technology.

At present, a display method for the performance of the object in the multiple dimensions is to display each dimension on a display page, and arrange and display multiple objects in each dimension. A user can view the performance of the multiple objects on a certain dimension by selecting the certain dimension.

However, there are at least the following technical problems in the above display method: the user needs to select different dimensions back and forth and search for the target object in the multiple objects in different dimensions, in order to observe the performance of the target object in the multiple dimensions, resulting in a low interaction efficiency between the user and a terminal.

SUMMARY

Embodiments of the present disclosure provide an information displaying method and device, which are used to overcome a problem that, in a display of performance of an object in multiple dimensions, a user need to select different dimensions back and forth in order to observe the performance of the object in the multiple dimensions, resulting in a poor interaction efficiency between the user and a terminal.

In a first aspect, an embodiment of the present disclosure provides an information displaying method, including:

displaying a quadrant diagram and multiple scatter points distributed in the quadrant diagram in a first area of a data analysis interface, where different scatter points correspond to different objects, and a coordinate of a scatter point in the quadrant diagram reflects performance of an object corresponding to the scatter point in terms of multiple indicators;

displaying an identification of the object in a second area of the data analysis interface.

In a second aspect, an embodiment of the present disclosure provides an information displaying device, including:

a first displaying unit, configured to display a quadrant diagram and multiple scatter points distributed in the quadrant diagram in a first area of a data analysis interface, where different scatter points correspond to different objects, and a coordinate of a scatter point in the quadrant diagram reflects performance of an object corresponding to the scatter point in terms of multiple indicators; and a second displaying unit, configured to display an identification of the object in a second area of the data analysis interface.

In a third aspect, an embodiment of the present disclosure provides an electronic device, including at least one processor and a memory;

the memory stores computer execution instructions;

the at least one processor executes the computer execution instructions stored in the memory, enabling the at least one processor to execute the information displaying methods according to the first aspect and various possible designs of the first aspect.

In a fourth aspect, an embodiment of the present disclosure provides a computer readable storage medium, where the computer readable storage medium stores computer execution instructions; when a processor executes the computer execution instructions, the information displaying method according to the first aspect and various possible designs of the first aspect is implemented.

In a fifth aspect, an embodiment of the present disclosure provides a computer program product including a computer program, where when the computer program is executed by a processor, the information displaying method according to the first aspect and various possible designs of the first aspect is implemented.

In a sixth aspect, an embodiment of the present disclosure provides a computer program, when the computer program is executed by a processor, the information displaying method according to the first aspect and various possible designs of the first aspect is implemented.

According to an information displaying method and device provided by the embodiment, a quadrant diagram and multiple scatter points distributed in the quadrant diagram are displayed in a first area of a data analysis interface, where different scatter points correspond to different objects, and a coordinate of a scatter point in the quadrant diagram reflects performance of an object corresponding to the scatter point in terms of multiple indicators, and an identification of the object is displayed in a second area of the data analysis interface. Therefore, in the embodiment, intuitive display of the performance of multiple objects in multiple dimensions is achieved through a distribution of multiple scatter points in the first area in the quadrant diagram, and information display of the object is improved through displaying the identification(s) of the object corresponding to the scatter point(s) in the second area, thereby improving an interaction efficiency between a user and a terminal.

BRIEF DESCRIPTION OF DRAWINGS

In order to provide a clearer explanation about technical solutions in embodiments of the present disclosure or in the prior art, a brief introduction will be made to accompanying drawings required in a description of the embodiments or the prior art. It is evident that the accompanying drawings in the following description are some embodiments of the present disclosure. For ordinary technical personnel in the art, other accompanying drawings can be obtained based on these accompanying drawings without paying any creative effort.

FIG. 2 is a schematic diagram of an application scenario provided by an embodiment of the present disclosure.

FIG. 3 is a flowchart I of an information displaying method provided by an embodiment of the present disclosure.

FIG. 5 is a flowchart diagram II of an information displaying method provided by an embodiment of the present disclosure.

FIG. 6*a* is a schematic diagram VII of a data analysis interface provided by an embodiment of the present disclosure.

DESCRIPTION OF EMBODIMENTS

In order to make purposes, technical solutions and advantages of embodiments of the present disclosure clearer, in the following, a clear and complete description about the technical solution in the embodiments of the present disclosure will be provided in conjunction with accompanying drawings. Obviously, the described embodiments are a part of the embodiments of the present disclosure, not all of them. Based on the embodiments in the present disclosure, all other embodiments obtained by ordinary technical personnel in the art without paying creative labor fall within a protection scope of the present disclosure.

Figure 1:
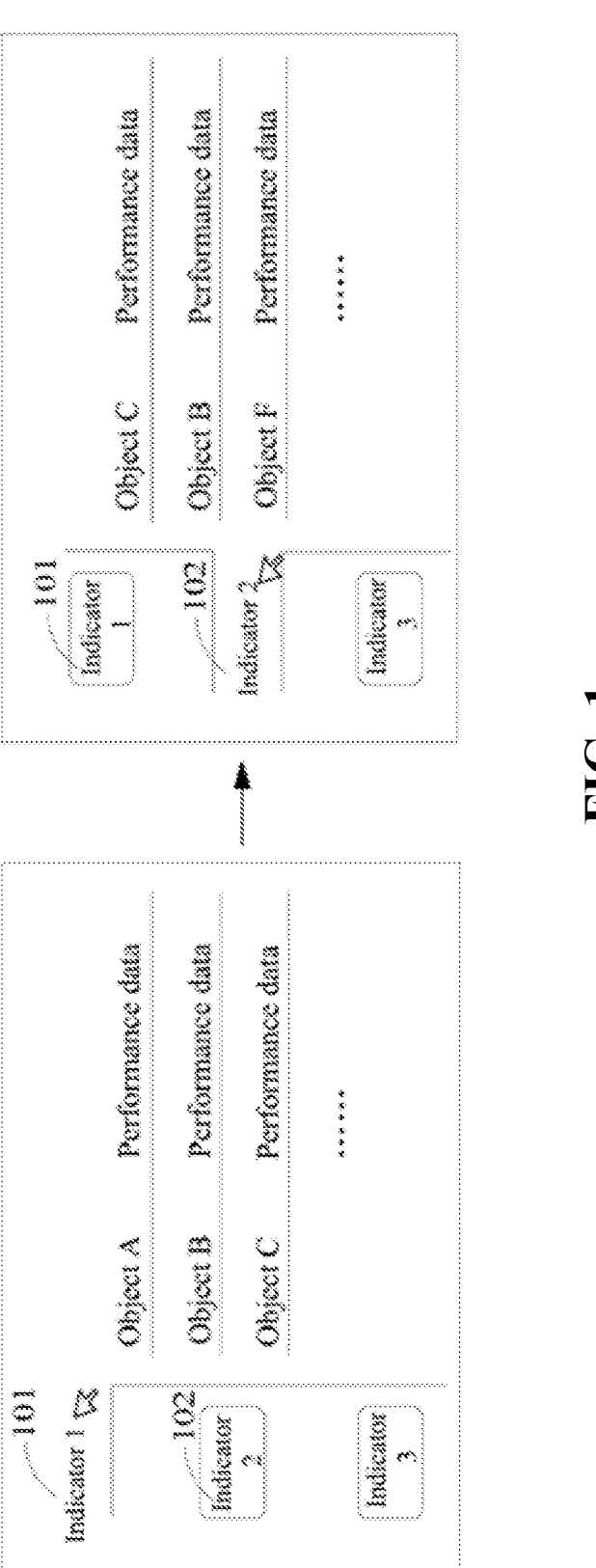
FIG. 1 is an exemplary diagram for information display in prior art.

Referring to FIG. 1, which is an exemplary diagram for information display in prior art. In the prior art, page labels corresponding to multiple indicators (i.e., multiple dimensions) are displayed on a page of a terminal. When a user selects a page label for a certain indicator, performance data of multiple objects in terms of the indicator corresponding to the page label selected by the user is displayed on the page. Referring to a left side figure of FIG. 1, when the user clicks on the page label 101 corresponding to the indicator 1, the performance data of the multiple objects in terms of the indicator 1 will be sequentially displayed on a right side of the page. For example, the performance data of an object A, an object B and an object C in terms of the indicator 1 are displayed in the left side figure of FIG. 1. Referring to a right side figure of FIG. 1, when the user clicks on the page label 102 corresponding to the indicator 2, the performance data of multiple objects in terms of the indicator 2 is sequentially displayed on the right side of the page. For example, the performance data of the object C, the object B, and an object F are displayed in the right side figure of FIG. 1. On the page shown in FIG. 1, if the user would like to view performance of a target object in terms of multiple indicators, he needs to click back and forth on the page labels corresponding to different indicators, and search for the performance data of the target object separately in the performance data of multiple objects in terms of each indicator. It can be seen that in the existing method for displaying the performance data of multiple objects in terms of multiple indicators, an interaction efficiency between the user and the page of the terminal is relatively low.

Referring to FIG. 2, which is a schematic diagram of an application scenario provided by an embodiment of the present disclosure. As shown in FIG. 2, the application scenario includes a user, a terminal 201 and a server 202. Where, in response to an action from the user, the terminal 201 requests data related to performance of multiple objects in terms of multiple indicators from the server 202, and displays the performance of the multiple objects in terms of the multiple indicators based on data returned by the server 202.

The terminal 201 communicates with the server 202, for example, through a network.

Where a terminal device can be a personal digital assistant (PDA) device, a handheld device with wireless communication capabilities (such as a smartphone, a tablet), a computing device (such as a personal computer (PC)), a vehicle-mounted device, a wearable device (such as a smart watch, a smart wristband), a smart home device (such as a smart display device) and the like. The server can be a centralized server, a distributed server, or a cloud server.

Referring to FIG. 3, which is a flowchart I of an information displaying method provided by an embodiment of the present disclosure. The method of the embodiment can be applied to a terminal device, and the information displaying method includes:

S301, display a quadrant diagram and multiple scatter points distributed in the quadrant diagram in a first area of a data analysis interface, where different scatter points correspond to different objects, and a coordinate of a scatter point in the quadrant diagram reflects performance of an object corresponding to the scatter point in terms of multiple indicators.

Where the data analysis interface is a front-end display page of the terminal device, such as a browser page, an application page and a mini-program page, which is used to display the performance of multiple objects in terms of multiple indicators to a user.

Specifically, when it is detected that the user is visiting the data analysis interface, the terminal sends a data acquiring request to a server, and the server sends page data of the data analysis interface to the terminal; then the terminal displays the data analysis interface based on the received page data, and displays the quadrant diagram and the multiple scatter points distributed in the quadrant diagram in the first area of the data analysis interface. Where the page data of the data analysis interface sent by the server to the terminal includes coordinates of the multiple scatter points in the quadrant diagram.

In an example, the quadrant diagram is represented as a two-dimensional coordinate system. At this time, a horizontal axis of the quadrant diagram corresponds to a first indicator, and a vertical axis of the quadrant diagram corresponds to a second indicator. In the quadrant diagram, an abscissa of a scatter point reflects performance of an object corresponding to the scatter point in terms of the first indicator, while an ordinate of the scatter point reflects the performance of the object corresponding to the scatter point in terms of the second indicator, thereby intuitively reflecting the performance of the object in terms of the multiple indicators.

In another example, the quadrant diagram is represented as a three-dimensional coordinate system. At this time, an X-axis of the quadrant diagram corresponds to the first indicator, a Y-axis of the quadrant diagram corresponds to the second indicator, and a Z-axis of the quadrant diagram corresponds to a third indicator. an X-axis coordinate, a Y-axis coordinate, and a Z-axis coordinate of a scatter point reflect performance of an object corresponding to the scatter point in terms of the first indicator, the second indicator and the third indicator respectively, thereby intuitively reflecting the performance of the object in terms of the multiple indicators.

S302, displaying an identification of the object in a second area of the data analysis interface.

Where the identification of the object is used to identify the object. For example, when the object is a product, the identification of the object is a combination of one or more of a product name, a product ID and a product image; when the object is a character, and the identification of the object is a combination of one or more of a name of the character, an ID of the character, or an image of the character (such as an avatar of the character).

Specifically, the terminal can receive identifications of multiple objects sent by the server and display the identifications of multiple objects in the second area of the data analysis interface, where the multiple objects belong to objects corresponding to the multiple scatter points in the quadrant diagram. Therefore, the user can efficiently determine scatter points corresponding to which objects are displayed in the quadrant diagram of the first area through the identifications of the objects displayed in the second area, that is, determine the performance of which objects in terms of multiple indicators are displayed in the quadrant diagram.

Figure 4A:
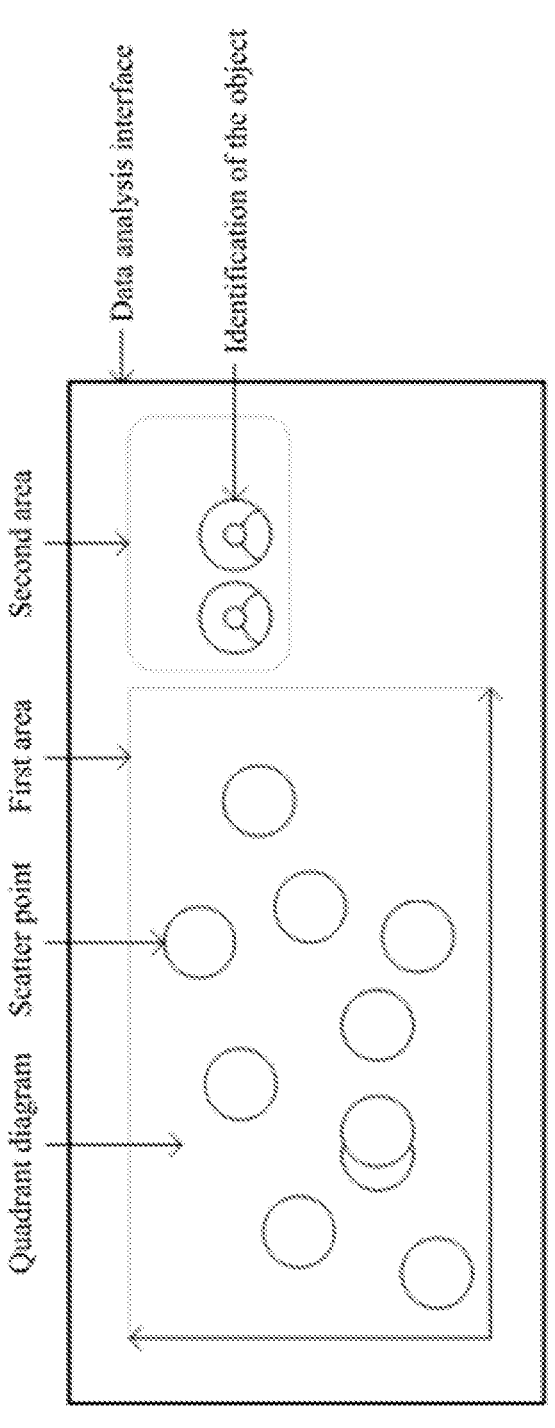
FIG. 4*a* is a schematic diagram I of a data analysis interface provided by an embodiment of the present disclosure.

Referring to FIG. 4a, which is a schematic diagram I of a data analysis interface provided by an embodiment of the present disclosure. As shown in FIG. 4a, a quadrant diagram of the data analysis interface is a two-dimensional coordinate system, a horizontal axis of the two-dimensional coordinate system corresponds to a first indicator, and a vertical axis of the two-dimensional coordinate system corresponds to a second indicator. An abscissa size of a scatter point reflects an indicator value of the scatter point in terms of the first indicator, and an ordinate size reflects the indicator value of the scatter point in terms of the second indicator. The identifications of the multiple objects are displayed in the second area of the data analysis interface, and the identifications of the objects displayed in the second area reflect scatter points corresponding to which objects are displayed in the first area.

In the embodiment of the present disclosure, by virtue of a distribution of the multiple scatter points in the quadrant diagram in the first area and the identifications of multiple objects in the second area, intuitive and clear display of the performance of the multiple objects in terms of the multiple indicators are realized. On one hand, the user can observe the performance of the multiple objects in terms of the multiple indicators by opening the data analysis interface without selecting different indicators back and forth by the user; on the other hand, it solves a problem that the performance of the objects in terms of different indicators is displayed in isolation, comprehensive performance of the object in terms of the multiple indicators can be reflected through the quadrant diagram, thus improving an information display effect, as well as the interaction efficiency between the user and the terminal.

There are multiple flexible modes for displaying the first and second areas of the data analysis interface, which will be described below in conjunction with schematic diagrams of multiple data analysis interfaces. Among them, shapes of the scatter points in the quadrant diagram can be circles, triangles, diamonds and the like. In the various schematic diagrams of the data analysis interfaces provided below, an example is taken where the shape of the scatter point is a circle. The coordinate of the scatter point in the quadrant diagram can be understood as the coordinate of a center point of the shape of the scatter point in the quadrant diagram. For example, when the shape of the scatter point is a circle, the coordinate of the scatter point is the coordinate of the circle center.

Figure 4B:
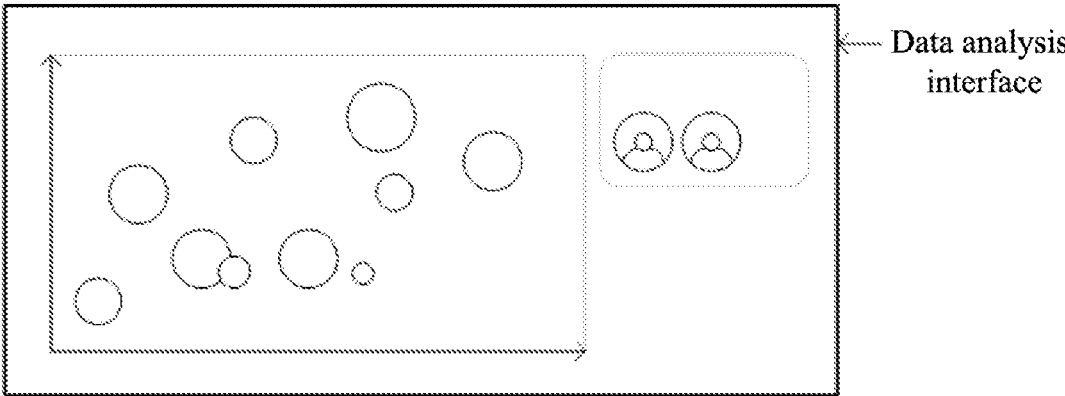
FIG. 4*b* is a schematic diagram II of a data analysis interface provided by an embodiment of the present disclosure.

Regarding the scatter points in the first area, following display methods are possible:

in one possible display method, sizes of the scatter points are the same. For example, referring to FIG. 4a, sizes of circles of respective scatter points are the same. The performance of each scatter point in terms of the first and second indicators can be clearly reflected through the distribution of the circles of respective scatter points in the quadrant diagram;

in another possible display method, a size of a scatter point is related to the size of an indicator value of an object corresponding to the scatter point in terms of a preset indicator. For example, the larger the indicator value of the object corresponding to the scatter point in terms of the preset indicator, the larger the size of the scatter point. Where the preset indicator can be the first indicator, the second indicator, or a third indicator other than the first indicator and the second indicator. When the preset indicator is the third indicator other than the first indicator and the second indicator, the scatter points distributed in the quadrant diagram can reflect the performance of the object in three dimensions (the first indicator, the second indicator and the third indicator). For example, referring to FIG. 4b (FIG. 4b is a schematic diagram II of a data analysis interface provided by an embodiment of the present disclosure), there are circular scatter points with different sizes in the quadrant diagram. Then the size of the indicator value of the scatter point in terms of the preset indicator is reflected through the size of the scatter point.

In an embodiment, for each scatter point, within multiple indicator value ranges, a target indicator range to which the indicator value of the object corresponding to the scatter point in terms of the preset indicator belongs is determined;

and in a preset correspondence between the multiple indicator value ranges and the sizes, the size of the scatter point is determined as a size corresponding to the target indicator range.

In an embodiment, for each scatter point, the size of the scatter point is determined based on a multiple of the indicator value of the object corresponding to the scatter point in terms of the preset indicator and a unit indicator value as well as a size corresponding to the unit indicator value.

Regarding the quadrant diagram of the first area, following display methods are possible:

in one possible display method, reference lines for the multiple indicators are displayed in the quadrant diagram, and the reference lines for the multiple indicators divide the quadrant diagram into multiple sub-quadrant areas, and performance qualities of the scatter points in different sub-quadrant areas vary depending on the multiple indicators. Therefore, a display effect of the performance of the multiple objects in terms of the multiple indicators can be further improved through the sub-quadrant areas where the reference lines and the scatter points are located. Where when the quadrant diagram is the two-dimensional coordinate system, the reference line for the first indicator and the reference line for the second indicator are displayed in the quadrant diagram. The reference line for the first indicator and the reference line for the second indicator divide the quadrant diagram into multiple sub-quadrant areas, and the performance qualities of the scatter points in different sub-quadrant areas in terms of the first and second indicators are different.

In an embodiment, the number of reference lines for the first indicator is 1, and the number of reference lines for the second indicator is 1. At this time, the reference line for the first indicator and the reference line for the second indicator divide the quadrant diagram into a first sub-quadrant area, a second sub-quadrant area, a third sub-quadrant area and a fourth sub-quadrant area. Among them, the first sub-quadrant area is the area located on a left side of the reference line for the first indicator and a lower side of the reference line for the second indicator in the quadrant diagram; the second sub-quadrant area is the area located on a right side of the reference line for the first indicator and the lower side of the reference line for the second indicator in the quadrant diagram; the third sub-quadrant area is the area located on the right side of the reference line for the first indicator and an upper side of the reference line for the second indicator in the quadrant diagram; and the fourth sub-quadrant area is the area located on the left side of the reference line for the first indicator and the upper side of the reference line for the second indicator.

Figure 4C:
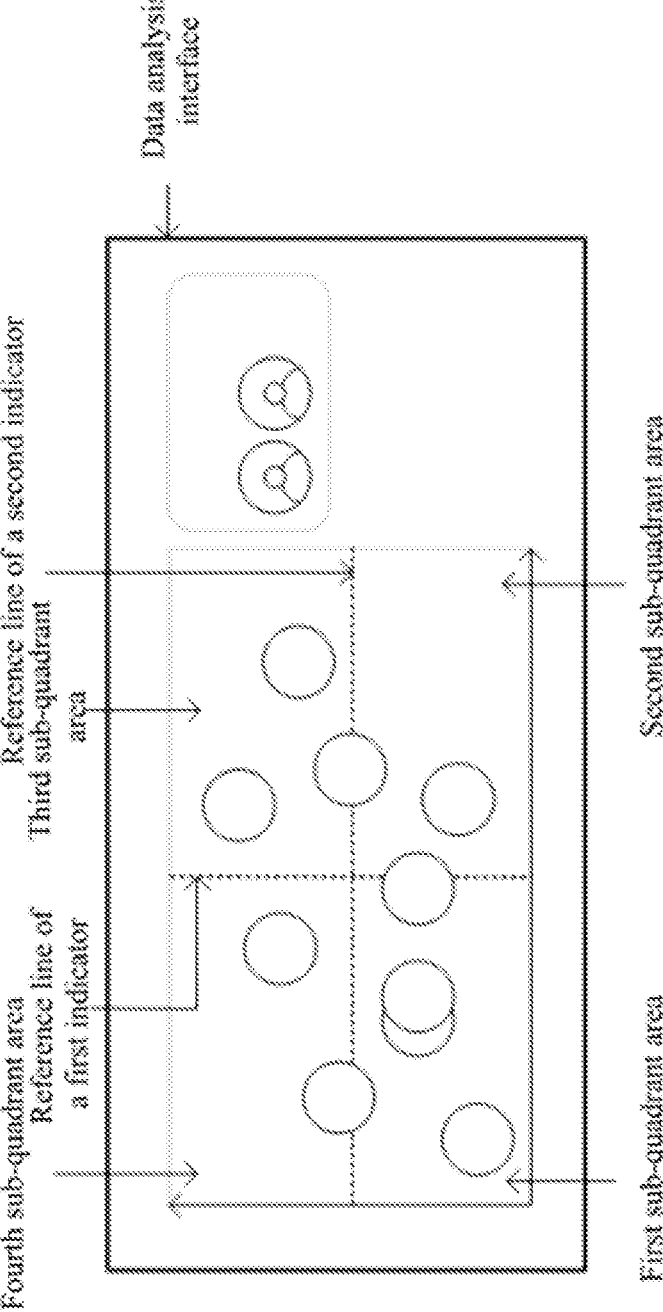
FIG. 4*c* is a schematic diagram III of the data analysis interface provided by the present disclosed embodiment.

Referring to FIG. 4c (FIG. 4c is a schematic diagram III of a data analysis interface provided by an embodiment of the present disclosure), which shows a reference line for a first indicator, a reference line for a second indicator, a first sub-quadrant area, a second sub-quadrant area, a third sub-quadrant area and a fourth sub-quadrant area that are displayed in a quadrant diagram. An example is taken where the larger indicator value of a scatter point in terms of an indicator corresponds to the better performance of the scatter point in terms of the indicator, it can be seen that objects corresponding to scatter points in the first sub-quadrant area perform poorly in terms of both the first and second indicators; objects corresponding to scatter points in the second sub-quadrant area perform well in terms of the first indicator, but perform poorly in terms of the second indicator; objects corresponding to scatter points in the third sub-quadrant area perform well in terms of both the first and second indicators; and objects corresponding to scatter points in the fourth sub-quadrant area perform well in terms of the second indicator, but perform poorly in terms of the first indicator. Therefore, performance qualities of the objects corresponding to the scatter points in terms of multiple indicators can be reflected through the sub-quadrant areas distributed with the scatter points, thereby further improving a display effect of the performance of the multiple objects in terms of the multiple indicators.

Regarding the second area, following display methods are possible:

in one possible display method, the number of second areas on the data analysis interface is one, for example, there is one second area in FIGS. 4a and 4b.

In an embodiment, when there is one second area, identifications of objects corresponding to all scatter points in the quadrant diagram are displayed in the second area. For example, when there are many scatter points, the user can view identifications of all the objects by dragging a progress bar in the second area.

In an embodiment, when there is one second area, identifications of a preset number of objects are displayed in the second area. For example, based on the performance of the object in terms of the multiple indicators, identifications of the preset number of objects are selected for display in a descending order based on their performance.

In an embodiment, when there is one second area, the number of scatter points in the quadrant diagram is also displayed in the second area.

In another possible display method, based on that the quadrant diagram is divided into multiple sub-quadrant areas by reference lines for multiple indicators, when there are multiple second areas, different second areas correspond to different sub-quadrant areas. At this time, S203 includes: displaying, in the second area, an identification of an object corresponding to a scatter point in a target sub-quadrant area, where the target sub-quadrant area is a sub-quadrant area corresponding to the second area. Therefore, a partitioned display of the identifications of multiple objects is achieved based on a correspondence between the multiple sub-quadrant areas and the multiple second areas, which is more conducive for a user to visually observe the performance qualities of different objects in terms of multiple indicators.

When the number of second areas is multiple, in one display method, the number of second areas is the same as the number of sub-quadrant areas, and the second areas correspond to the sub-quadrant areas one by one. At this time, for each sub-quadrant area, the identification(s) of the object(s) corresponding to the scatter point(s) in a sub-quadrant area is displayed in the second area that uniquely corresponds to this sub-quadrant area, and the partitioned display of the identifications of the objects corresponding to the scatter points in different sub-quadrant areas is achieved. The user can more efficiently determine the sub-quadrant area(s) where scatter points corresponding to respective objects are located.

Figure 4D:
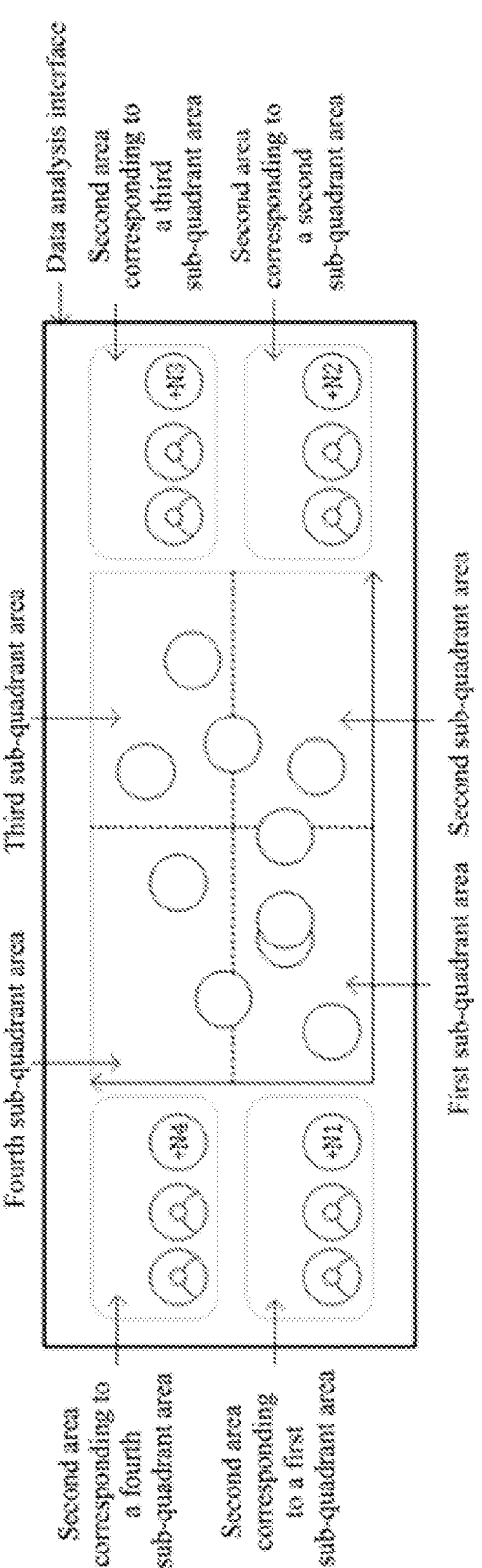
FIG. 4*d* is a schematic diagram IV of a data analysis interface provided by an embodiment of the present disclosure.

Referring to FIG. 4d (FIG. 4d is a schematic diagram IV of a data analysis interface provided by an embodiment of the present disclosure), a quadrant diagram includes a first sub-quadrant area, a second sub-quadrant area, a third sub-quadrant area and a fourth sub-quadrant area. There are four second areas on the data analysis interface: a second area corresponding to the first sub-quadrant area, a second area corresponding to the second sub-quadrant area, a second area corresponding to the third sub-quadrant area and a second area corresponding to the fourth sub-quadrant area. In the second area corresponding to the first sub-quadrant area, identifications of objects corresponding to scatter points in the first sub-quadrant area are displayed; in the second area corresponding to the second sub-quadrant area, identifications of objects corresponding to scatter points in the second sub-quadrant area are displayed; in the second area corresponding to the third sub-quadrant area, identifications of objects corresponding to scatter points in the third sub-quadrant area are displayed; in the second area corresponding to the fourth sub-quadrant area, identifications of objects corresponding to the scatter points in the fourth sub-quadrant area are displayed. Therefore, a user can know the sub-quadrant area where the scatter point corresponding to each object is located.

In an embodiment, if the number of the scatter points in the target sub-quadrant area is greater than a preset threshold, the identification(s) of the object(s) corresponding to the scatter point(s) with the number of the preset threshold in the target sub-quadrant area will be displayed in the second area, and the number of scatter points in the target sub-quadrant area will be displayed. Therefore, when the number of scatter points in the target sub-quadrant area is large, it is convenient to display more information to the user while maintaining a simplicity of the page by displaying the identifications of the objects corresponding to some scatter points in the target sub-quadrant area and the number of the scatter points in the target sub-quadrant area. Where scatter data displayed in the second area can be a total number of the scatter points in the target sub-quadrant area, or can be the number of scatter points for which the identification(s) of the object(s) is(are) not displayed in the second area.

As shown in FIG. 4d, in the second area corresponding to the first sub-quadrant area, the number of the scatter points N1 in the first sub-quadrant area is displayed; in the second area corresponding to the second sub-quadrant area, the number of the scatter points N2 in the second sub-quadrant area is displayed; in the second area corresponding to the third sub-quadrant area, the number of the scatter points N3 in the third sub-quadrant area is displayed; and in the second area corresponding to the fourth sub-quadrant area, the number of the scatter points N4 in the fourth sub-quadrant area is displayed.

When the number of the second areas is multiple, in another display method, the number of the second areas is smaller than the number of the sub-quadrant areas. At this time, among the multiple second areas, there exist a second area corresponding to at least two sub-quadrant areas and a second area corresponding to one sub-quadrant area.

Figure 4E:
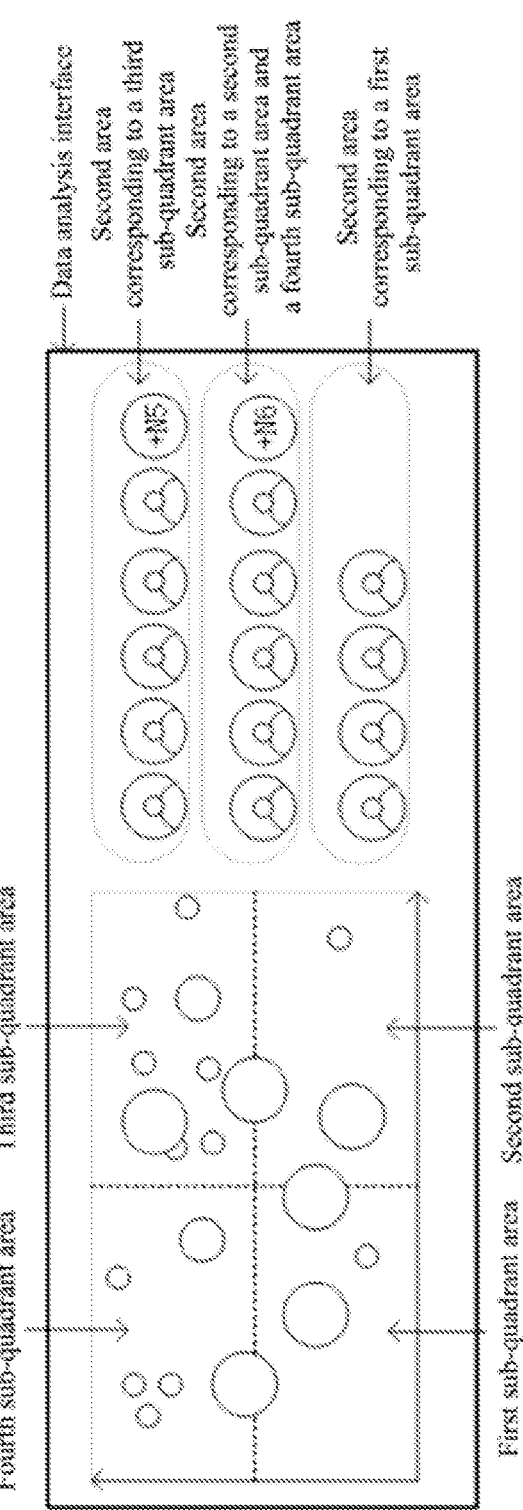
FIG. 4*e* is a schematic diagram V of a data analysis interface provided by an embodiment of the present disclosure.
Figure 4F:
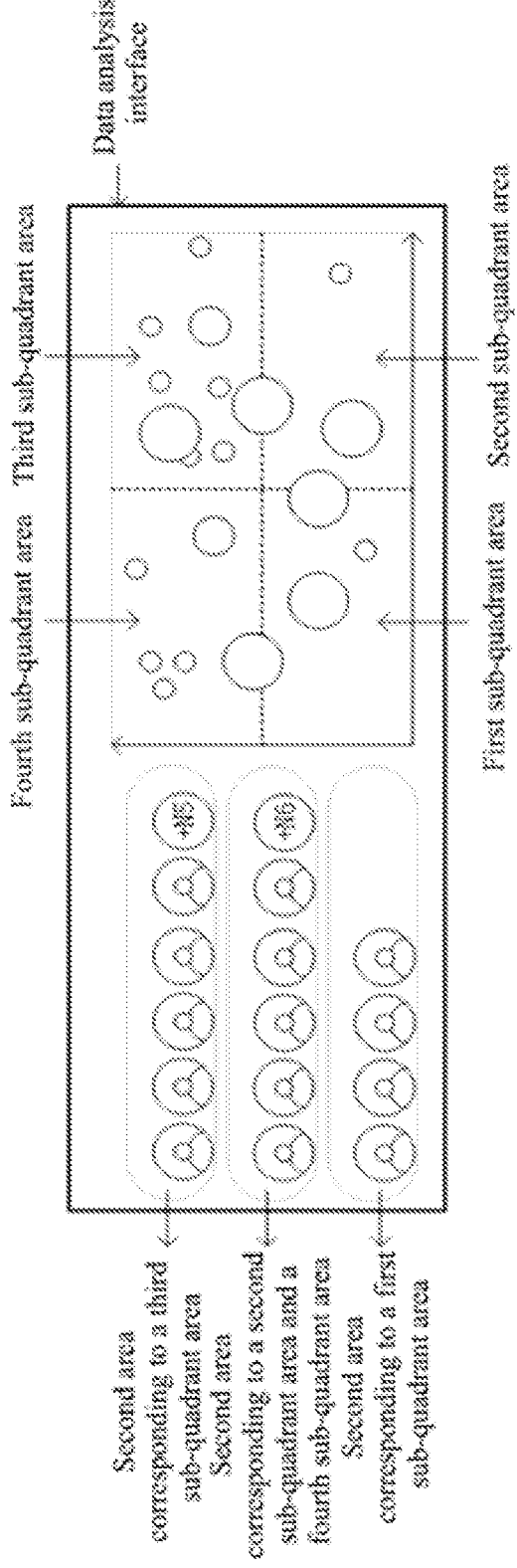
FIG. 4*f* is a schematic diagram VI of a data analysis interface provided by an embodiment of the present disclosure.

Referring to FIGS. 4e and 4f, where FIG. 4e is a schematic diagram V of a data analysis interface provided by an embodiment of the present disclosure, and FIG. 4f is the schematic diagram VI of the data analysis interface provided by an embodiment of the present disclosure. In FIGS. 4e and 4f, an example is taken where there are scatter points with inconsistent sizes among multiple scatter points. In FIGS. 4e and 4f, a quadrant diagram includes a first sub-quadrant area, a second sub-quadrant area, a third sub-quadrant area and a fourth sub-quadrant area. On the data analysis interface, there are three second areas: a second area corresponding to the first sub-quadrant area, a second area corresponding to the second sub-quadrant area and the fourth sub-quadrant area, as well as a second area corresponding to the third sub-quadrant area. In the second area corresponding to the first sub-quadrant area, identifications of objects corresponding to scatter points in the first sub-quadrant area are displayed; in the second area corresponding to the second sub-quadrant area and the fourth quadrant area, identifications of objects corresponding to scatter points in the second sub-quadrant area and identifications of objects corresponding to scatter points in the fourth sub-quadrant area are displayed; and in the second area corresponding to the third sub-quadrant area, identifications of objects corresponding to scatter points in the third sub-quadrant area are displayed. Therefore, taking advantage of a similarity in performance of the objects corresponding to the scatter points in the second sub-quadrant area and the objects corresponding to the scatter points in the fourth sub-quadrant area in terms of multiple indicators, the identifications of the objects corresponding to the scatter points in the second sub-quadrant area and the identifications of the objects corresponding to the scatter points in the fourth sub-quadrant area are displayed in a same second area.

As an example, in FIGS. 4e and 4f, an upper limitation for the number of identifications of objects that can be displayed in the second area is 5, N4 represents the number of scatter points in the third sub-quadrant area whose identification(s) of the object(s) is(are) not displayed in the second area, and N5 represents the number of scatter points in the second and fourth sub-quadrant areas whose identification(s) of the object(s) are not displayed in the second area.

Regarding a relative position of the first area and the second area, following display methods are possible:

in one possible display method, the second area is located on one side of the first area.

For example, when there is one second area, referring to FIGS. 4a to 4c, the second area is located on a right side of the first area. Of course, the second area may also be located on a left side, an upper side or a lower side of the first area.

For another example, when there are multiple second areas, referring to FIGS. 4e and 4f, in FIG. 4e, the multiple second areas are all located on the right side of the first area; and in FIG. 4f, the multiple second areas are all located on the left side of the first area. Of course, the multiple second areas may also be located on the upper side or lower side of the first area.

In another possible display method, the second area is located around a sub-quadrant area corresponding to the second area, in order to reflect a correspondence between the second area and the sub-quadrant area through a position relationship between the second area and the sub-quadrant area, making the correspondence between the second area and the sub-quadrant area more intuitive. Referring to FIG. 4d, in FIG. 4d, the four second areas are located around the corresponding sub-quadrant areas.

In the embodiment of the present disclosure, multiple interaction modes between the user and the data analysis interfaces are provided. In the following, an interaction between the user and the data analysis interface will be described in conjunction with corresponding method flow diagrams and interface diagrams. It should be noted that subsequent interaction methods can be flexibly applied to the display methods mentioned above.

Referring to FIG. 5, which is a flowchart diagram II of an information displaying method provided by an embodiment of the present disclosure. The method of the embodiment can be applied to a terminal device, and the information displaying method includes:

S501, display a quadrant diagram and multiple scatter points distributed in the quadrant diagram in a first area of a data analysis interface, where different scatter points correspond to different objects, and a coordinate of a scatter point in the quadrant diagram reflects performance of an object corresponding to the scatter point in terms of multiple indicators;

S502, display an identification of the object in a second area of the data analysis interface.

Reference may be made to a description of the foregoing embodiments for S501 and S502, which will not be elaborate.

S503, display multi-dimensional attribute information of an object corresponding to a scatter point selected by a user in response to a selection operation of the user for the scatter point.

Where the selection operation of the user for the scatter point includes, for example, moving a mouse cursor to the scatter point, clicking on the scatter point through a mouse or a touch screen, or selecting the scatter point through a keyboard input.

Specifically, if the selection operation of the user for the scatter point(s) is detected in the first area, the scatter point(s) selected by the user is(are) determined in the first area in response to the selection operation of the user for the scatter point(s), and the object(s) corresponding to the scatter point(s) selected by the user is(are) determined based on a correspondence between the scatter point(s) and the object(s). The multi-dimensional attribute information of the object(s) corresponding to the scatter point(s) selected by the user can be obtained from a local storage of the terminal device, and/or the multi-dimensional attribute information of the object(s) corresponding to the scatter point(s) selected by the user can be requested from the server. The multi-dimensional attribute information is displayed on the data analysis interface after the multi-dimensional attribute information of the object(s) corresponding to the scatter point(s) selected by the user is obtained.

As an example, the multi-dimensional attribute information of the object is the coordinate of the scatter point corresponding to the object. When the user selects the scatter point, the coordinate of this scatter point is displayed in the quadrant diagram.

As an example, a display area for multi-dimensional attribute information of an object is pre-set on the data analysis interface. In response to the selection operation of the user for the scatter point(s), the multi-dimensional attribute information of the object(s) corresponding to the scatter point(s) selected by the user is displayed in this display area.

In some embodiments, S503 includes: in response to the selection operation of the user for the scatter point, distinguishably displaying the multi-dimensional attribute information of the object corresponding to the scatter point selected by the user in the first area to distinguish the scatter point selected by the user and remaining scatter points, so as to highlight the multi-dimensional attribute information of the object corresponding to the scatter point selected by the user, thus making the multi-dimensional attribute information of the scatter point selected by the user more prominent on the page and improving a display effect.

In one possible implementation, the multi-dimensional attribute information of the object corresponding to the scatter point selected by the user is distinguishably displayed through different text styles or background colors.

In one possible implementation, the multi-dimensional attribute information of the object includes historical performance data of the object in terms of multiple indicators. At this time, the distinguishable display of the multi-dimensional attribute information of the object corresponding to the scatter point selected by the user is implemented through displaying the historical performance data of the object corresponding to the scatter point selected by the user in terms of the multiple indicators in a surrounding area of the scatter point selected by the user.

In an embodiment, in response to the selection operation of the user for the scatter point, a pop-up box (also known as a bubble) can be used to display the historical performance data of the object corresponding to the scatter point selected by the user in terms of multiple indicators around the scatter point selected by the user. For example, referring to FIG. 6a (FIG. 6a is a schematic diagram VII of an data analysis interface provided by an embodiment of the present disclosure), in the pop-up box above the scatter point selected by the user, the historical performance data of an object A, i.e., "Object A: . . . ", corresponding to the scatter point selected by the user in terms of multiple indicators is displayed.

Furthermore, after detecting that the selection operation of the user for the scatter point ends up (for example, a mouse cursor is moved to a remaining area outside the scatter point previously selected by the user), the distinguishable display of the multi-dimensional attribute information of the object corresponding to the scatter point previously selected by the user is stopped. For example, the pop-up box used to display the multi-dimensional attribute information of the object corresponding to the scatter point previously selected by the user is turned off.

In one possible implementation, it is considered that when the user is selecting the scatter point, the scatter point whose position overlaps with the scatter point that is desired to be select by the user will cause interference to the selection operation of the user. To improve an interaction efficiency between the user and the terminal and prevent the overlapped position of the scatter point from affecting the efficiency for viewing the multi-dimensional attribute information of the object corresponding to the scatter point by the user, on the basis of a scheme of "displaying the historical performance data of the object corresponding to the scatter point selected by the user in terms of multiple indicators in the surrounding area of the scatter point selected by the user", S503 further includes: displaying historical performance data of an object corresponding to a first target scatter point in terms of multiple indicators in the surrounding area of the scatter point selected by the user. Where the first target scatter point is a scatter point whose position overlaps with the scatter point selected by the user. Therefore, when there exists the first target scatter point in the quadrant diagram whose position overlaps with the scatter point selected by the user, the historical performance data of the object corresponding to the scatter point selected by the user and the object corresponding to the first target scatter point in terms of multiple indicators are displayed in the surrounding area of the scatter point selected by the user, thus effectively solving an impact caused by the overlapped position of the scatter point on viewing of the historical performance data of the object corresponding to the scatter point in terms of multiple indicators by the user.

Figure 6B:
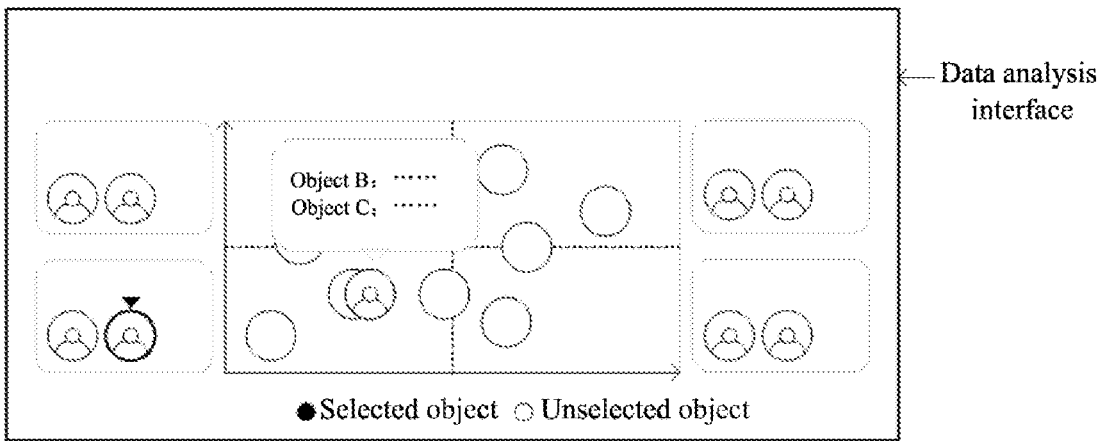
FIG. 6*b* is a schematic diagram VIII of a data analysis interface provided by an embodiment of the present disclosure.

In an embodiment, in response to the selection operation of the user for the scatter point, the historical performance data of the object corresponding to the scatter point selected by the user in terms of multiple indicators, as well as the historical performance data of the object corresponding to the scatter point whose position overlaps with the scatter point selected by the user in terms of multiple indicators are displayed through a pop-up box around the scatter point selected by the user. For example, referring to FIG. 6b (FIG. 6b is a schematic diagram VIII of a data analysis interface provided by an embodiment of the present disclosure), the object corresponding to the scatter point selected by the user is an object B, and the object corresponding to the scatter point whose position overlaps with the scatter point selected by the user is an object C. Therefore, in the pop-up box above the scatter point selected by the user, the historical performance data of the object B in terms of multiple indicators, i.e., "Object B: . . . " and the historical performance data of the object C in terms of multiple indicators, i.e., "Object C: . . . " are displayed.

In one possible implementation, on the basis of the scheme of "displaying the historical performance data of the object corresponding to the scatter point selected by the user in terms of multiple indicators in the surrounding area of the scatter point selected by the user", S503 further includes: displaying historical performance data of an object corresponding to a first target scatter point in terms of multiple indicators in a surrounding area of the first target scatter point. Therefore, for each scatter point with an overlapped position, the historical performance data of the object corresponding to the scatter point in terms of multiple indicators is displayed in the surrounding area of the scatter point, which is convenient for the user to determine a correspondence between the displayed historical performance data and the scatter point.

Figure 6C:
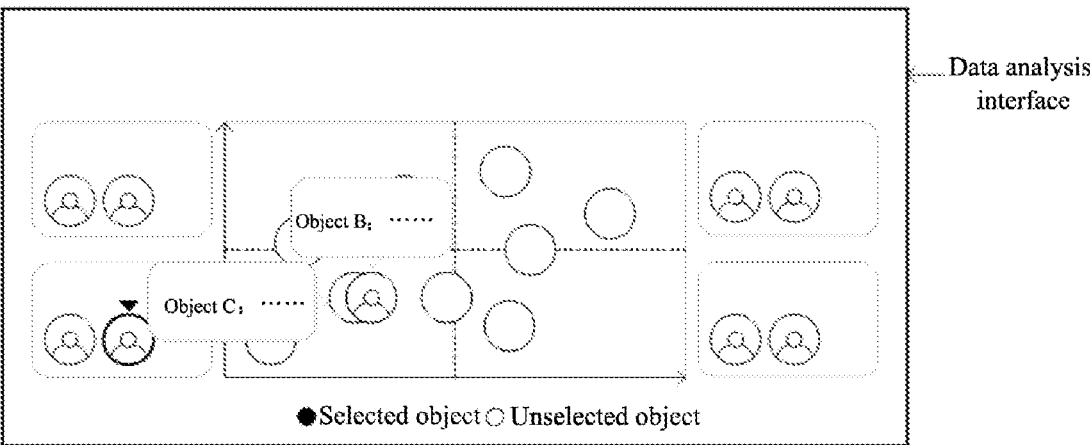
FIG. 6*c* is a schematic diagram IX of a data analysis interface provided by an embodiment of the present disclosure.

In an embodiment, in response to the selection operation of the user for the scatter point, the historical performance data of the object corresponding to the scatter point selected by the user in terms of multiple indicators can be displayed through a pop-up box around the scatter point selected by the user, and the historical performance data of the object corresponding to the scatter point whose position overlaps with the scatter point selected by the user in terms of multiple indicators can be displayed in the surrounding area of the scatter point whose position overlaps with the scatter point selected by the user. For example, referring to FIG. 6c (FIG. 6c is a schematic diagram IX of a data analysis interface provided by an embodiment of the present disclosure), the object corresponding to the scatter point selected by the user is the object B, and the object corresponding to the scatter point whose position overlaps with the scatter point selected by the user is the object C. Therefore, in the pop-up box above the scatter point selected by the user, the historical performance data of the object B in terms of multiple indicators, i.e., "Object B: . . . " is displayed; and in the pop-up box above the scatter point whose position overlaps with the scatter point selected by the user, the historical performance data of the object C in terms of multiple indicators, i.e., "Object C: . . . " is displayed.

In some embodiments, the multi-dimensional attribute information of the object further includes an image of the object. At this time, the distinguishably displaying the multi-dimensional attribute information of the object corresponding to the scatter point selected by the user, further includes: displaying an image of the object corresponding to the scatter point selected by the user within the scatter point selected by the user. Therefore, when the user selects the scatter point, the image of the object corresponding to the scatter point selected by the user is displayed in this scatter point, while images of corresponding objects are not displayed in the remaining scatter points. On the one hand, there is a significant visual difference between the scatter point selected by the user and the remaining scatter points; and on the other hand, the image displayed within the scatter point selected by the user makes it convenient for the user to identify the object corresponding to the scatter point.

Referring to FIGS. 6a to 6c. In FIG. 6a, the scatter point selected by the user corresponds to the object A, and the image of the object A is displayed within the scatter point selected by the user; and In FIGS. 6b and 6c, the scatter points selected by the user correspond to the object B, and the image of the object B is displayed within the scatter point selected by the user. It can be seen that in FIGS. 6a to 6c, no content is displayed in the remaining scatter points except for the scatter point selected by the user, a distinguishable display effect for the scatter point selected by the user is achieved. Of course, in addition to displaying the image, the scatter point selected by the user can also be distinguishably displayed by displaying a preset color, preset text and other methods within the scatter point selected by the user.

In an embodiment, a reminder can be displayed below the quadrant diagram, and the reminder is used to remind the user of a scatter point style corresponding to selected object and a scatter point style corresponding to unselected objects. For example, in FIGS. 6a to 6c, the scatter point style corresponding to the selected object is a solid circle, indicating that there is displayed content within the scatter point of the selected object; and the scatter style corresponding to the unselected objects is a hollow circle, indicating that there is no displayed content within the scatter points of the unselected objects.

In the embodiment of the present disclosure, on the data analysis interface, the performance of multiple objects in terms of multiple indicators can be intuitively and clearly displayed through the distribution of the multiple scatter points in the quadrant diagram and the identifications of the multiple objects in the second area, and the multi-dimensional attribute information of the object corresponding to the scatter point selected by the user can be displayed in respond to the selection operation of the user for the scatter point in the first area, thus effectively improving the display effect of the performance of multiple objects in terms of multiple indicators, and improving the interaction efficiency between the user and the terminal.

On the data analysis interface, the user can not only interact with the scatter point(s) in the first area by performing the selection operation(s), but also interact with the displayed content in the second area, the following are interaction methods:

in some embodiments, in response to a selection operation of the user for the identification of the object, distinguishably display the identification of the object selected by the user in the second area, thereby an interaction between the user and the identification of the object displayed in the second area is realized, and the identification selected by the user can be distinguishably displayed, thus improving the display effect.

In an embodiment, in the second area, edges of the identification of the object selected by the user are highlighted in bold, or the identification of the object selected by the user is highlighted by a color different from that of the identifications of the remaining objects in the second area. For example, the method applied in FIGS. 6a and 6b is to display the edges of the identification of the object selected by the user in the second area in bold.

In an embodiment, in the second area, a directional icon is added around the identification selected by the user, where a direction of the directional icon points to the identification selected by the user, in order to achieve the distinguishable display of the identification selected by the user. For example, the directional icons used in FIGS. 6a and 6b are inverted triangle icons located above the identification selected by the user.

In some embodiments, when the number of scatter points in a sub-quadrant area corresponding to the second area is displayed in the second area, a sub-interface of the data analysis interface is displayed in response to the selection operation of the user for the number of the scatter points displayed in the second area. On the sub-interface, historical performance data of objects corresponding to all scatter points in at least one sub-quadrant area in the quadrant diagram in terms of multiple indicators is displayed.

For example, if the user selects the number of the scatter points displayed in the second area, where the second area corresponds to a first sub-quadrant area, then the historical performance data of the objects corresponding to all scatter points in the first sub-quadrant area in terms of multiple indicators can be displayed on the sub-interface; alternatively, the historical performance data of the objects corresponding to all scatter points in all sub-quadrant areas in terms of multiple indicators can be displayed on the sub-interface.

Therefore, the user can view the historical performance data of the objects corresponding to all scatter points in at least one sub-quadrant area in terms of multiple indicators on the sub-interface by selecting the number of the scatter points displayed in the second area, which solves a problem of limited content displayed in the second area, since more detailed information is displayed through the sub-interface. If the user does not need to view the more detailed information, the content displayed in the second area can meet requirements of the user; and if the user needs to view the more detailed information, he can select the number of the scatter points in the second area to trigger display of the sub-interface, and view the more detailed information about the object on the sub-interface.

Furthermore, display page labels corresponding to multiple sub-quadrant areas in the quadrant diagram on the sub-interface; and in response to a selection operation of the user for a page label, display the historical performance data of the objects corresponding to all the scatter points in a corresponding sub-quadrant area in terms of multiple indicators on the sub-interface. Therefore, the user can view the historical performance data of the objects corresponding to scatter points in different sub-quadrant areas in terms of multiple indicators by switching the selected page labels on the sub-interface.

Figure 6D:
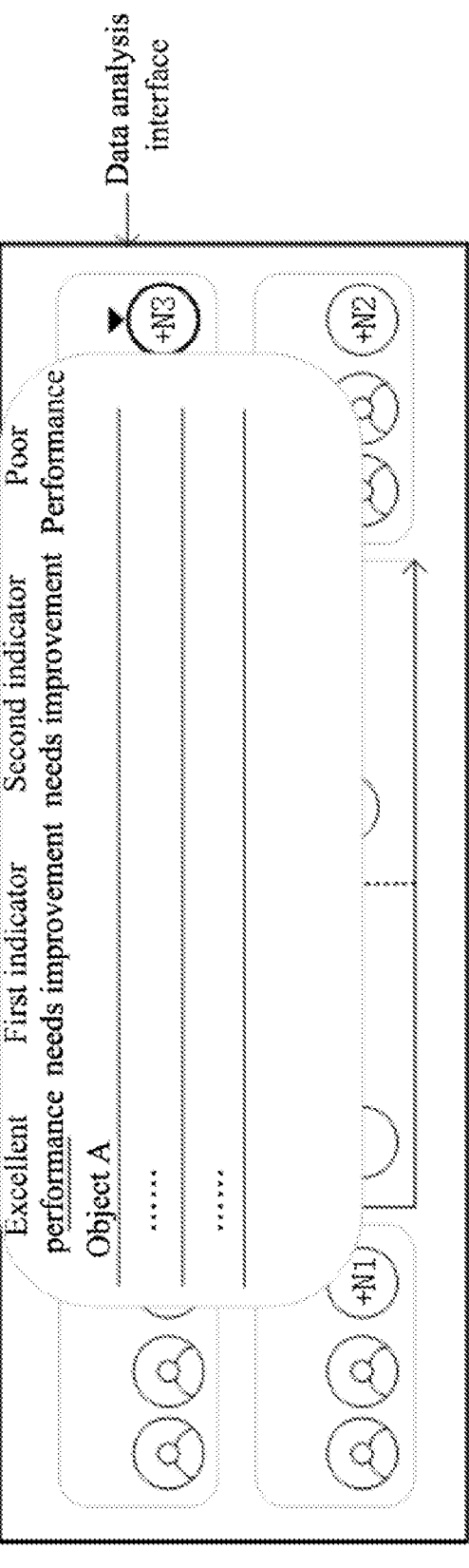
FIG. 6*d* is a schematic diagram X of a data analysis interface provided by an embodiment of the present disclosure.

Referring to FIG. 6d, which is a schematic diagram X of a data analysis interface provided by an embodiment of the present disclosure. As shown in FIG. 6d, there are four page labels displayed on a sub-interface: "Excellent performance", "First indicator needs improvement", "Second indicator needs improvement" and "Poor performance". Among them, "Excellent performance", "First indicator needs improvement", "Second indicator needs improvement" and "Poor performance" correspond to a third sub-quadrant area, a fourth sub-quadrant area, a second sub-quadrant area and a first sub-quadrant area respectively. Therefore, when a user selects the number of scatter points N3 in a second area corresponding to the third sub-quadrant area, in response to an operation of the user for the number of the scatter points N3, the sub-interface of the data analysis interface is displayed, and the sub-interface is switched to display historical performance data of the objects under "Excellent performance" (the object A is taken as an example in FIG. 6d) in terms of multiple indicators, that is, the historical performance data of the objects corresponding to the scatter points in the third sub-quadrant area in terms of multiple indicators. The user can select any one of the four page labels on the sub-interface to view the historical performance data of the objects corresponding to the scatter points in other sub-quadrant areas in terms of multiple indicators.

On the data analysis interface, the display of the scatter points in the quadrant diagram can be linked with the display of the identification of the object in the second area. Linkage methods can include one or more of the following:

Manner 1, in response to a selection operation of the user for the scatter point, distinguishably displaying the identification of the object corresponding to the scatter point selected by the user in the second area;

Manner 2, in response to the selection operation of the user for the identification of the object, distinguishably displaying multi-dimensional attribute information of an object corresponding to a second target scatter point in a surrounding area of the second target scatter point in the first area, where the second target scatter point is a scatter point corresponding to the identification selected by the user.

Specifically, in Manner 1, when the user selects the scatter point in the first area, the identification of the object corresponding to the scatter point selected by the user in the second area will be distinguishably displayed. Therefore, when the user selects the scatter point, the user can determine the object corresponding to the scatter point in combination with the identification which is distinguishably displayed in the second area, and then accurately determine the performance of the object in terms of multiple indicators based on a distribution of the scatter point in the quadrant diagram. Reference can be made to a description of foregoing embodiments for the method for distinguishably displaying the identification of the object in the second area, which will not be elaborate herein.

Specifically, in Manner 2, when the user selects the identification of the object in the second area, the multi-dimensional attribute information of the object to which the identification selected by the user belongs is distinguishably displayed in the surrounding area of the scatter point corresponding to the object to which the identification selected by the user belongs in the first area. Therefore, the user can observe the scatter point which is distinguishably displayed in the quadrant diagram by selecting the identification of the object in the second area, and then determine the performance of the object in terms of multiple indicators based on the coordinate of the scatter point. Reference can be made to the description of the foregoing embodiments for the method for displaying the multi-dimensional attribute information of the object around the scatter point, which will not be elaborate herein.

Referring to FIGS. 6a and 6b, when the user selects the scatter point in the quadrant diagram, the multi-dimensional attribute information of the object corresponding to the scatter point can be distinguishably displayed in the first area and the identification of the object can be distinguishably displayed in the second area. Similarly, when the user selects the identification of the object in the second area, the multi-dimensional attribute information of the object corresponding to the scatter point can be distinguishably displayed in the first area and the identification of the object can be distinguishably displayed in the second area. Therefore, through the above linkage between the first area and the second area, the identification of the object corresponding to the scatter point selected by the user and the scatter point corresponding to the object to which the identification selected by the user belongs can be clearly displayed on the data analysis interface, thus effectively improving visual intuition (visualization) of the performance of multiple objects in terms of multi-dimensional indicators, as well as an interaction efficiency between the user and the terminal.

In some embodiments, in the first area of the data analysis interface, after displaying the quadrant diagram and multiple scatter points distributed in the quadrant diagram, it is possible to determine, in response to an object search request of the user, a third target object from objects corresponding to all scatter points in the quadrant diagram based on a keyword input by the user, and display multi-dimensional attribute information of the third target object in the first area, thereby achieving a search of objects and scatter points.

Specifically, the user inputs the keyword (such as inputting an ID of an object and a name of the object) in an input box or a search box of the data analysis interface, and sends the object search request. The terminal device obtains, in response to the search request of the user, the keyword input by the user, determines, based on the keyword input by the user, an object that matches the keyword input by the user among the objects corresponding to multiple scatter points in the quadrant diagram, and determines the object that matches the keyword input by the user as the third target object. The terminal displays the multi-dimensional attribute information of the third target object in the first area, for the display of the multi-dimensional attribute information of the third target object, reference can be made to the description of displaying, in the first area, the multi-dimensional attribute information of the object corresponding to the scatter point in the foregoing embodiments.

In an embodiment, the identification of the third target object is distinguishably displayed in the second area. Therefore, the user can directly observe the scatter point corresponding to the object in the first area after searching for the object, and directly observe the identification of the object in the second area, thus effectively improving the interaction efficiency between the user and the terminal.

Figure 6E:
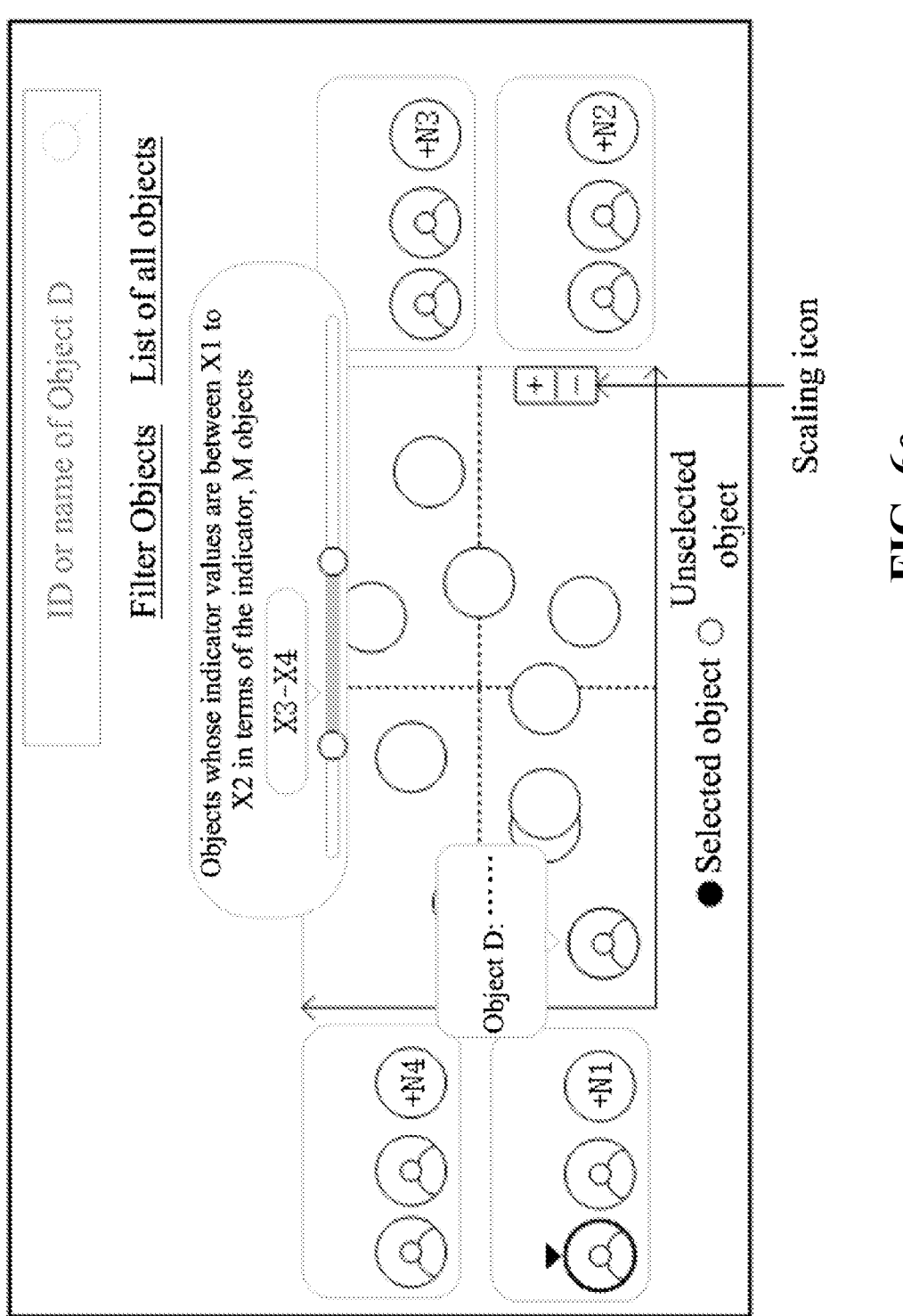
FIG. 6*e* is a schematic diagram XI of a data analysis interface provided by an embodiment of the present disclosure.

Referring to FIG. 6e, which is a schematic diagram XI of a data analysis interface provided by an embodiment of the present disclosure. In FIG. 6e, the user inputs an ID or a name of an object D in the input box to search for the object D; after finding the object D, on one hand, the terminal displays historical performance information of the object D in terms of multiple indicators through a pop-up box in a surrounding area of a scatter point corresponding to the object D, and displays an image of the object D within the scatter point corresponding to the object D; and on the other hand, distinguishably displays the identification of the object D in the second area.

In an embodiment, the terminal can perform a fuzzy research or a precise search based on the keyword input by the user.

If the keyword input by the user is the ID of the object, the terminal can perform the precise search due to a uniqueness of the ID of the object. If the keyword input by the user is the name of the object, the terminal can perform the fuzzy search based on the keyword input by the user, determine multiple search results, then display the multiple search results through a drop-down box below the input box, and determine the search result selected by the user in the drop-down box as a final search result.

In some embodiments, in the first area of the data analysis interface, after displaying the quadrant diagram and the multiple scatter points distributed in the quadrant diagram, in response to an object filtering request of the user, display a scatter point corresponding to an object whose indicator value meets an indicator filtering range in the quadrant diagram based on the indicator filtering range input by the user. Therefore, the user can filter the scatter point(s) that meet(s) the indicator filtering range by inputting the indicator filtering range, that is, filter the object(s) that meet(s) the indicator filtering range and adjust the number of scatter points in the quadrant diagram, thus improving an interaction efficiency as well as a flexibility of displaying the quadrant diagram and the scatter points in the quadrant diagram on the data analysis interface.

Referring to FIG. 6e, after the user clicks "Filter Object", a input box for the indicator filtering range will be displayed on the data analysis interface, and the user can adjust the indicator filtering range to X3-X4 by dragging an adjustment progress bar in the input box. Where the input box for the indicator filtering range shows the adjustment progress bar of the indicator filtering range, the indicator filtering range X1-X2 before an adjustment, the number of objects M with their indicator values falling between X1-X2 and the indicator filtering range X3-X4 after the adjustment.

In some embodiments, in the first area of the data analysis interface, after displaying the quadrant diagram and the multiple scatter points distributed in the quadrant diagram, scale the quadrant diagram and the scatter points in the quadrant diagram in the first area in response to a size scaling operation of the user for the quadrant diagram, thereby achieving a flexible adjustment for the sizes of the quadrant diagram and the scatter points in the quadrant diagram.

Among them, under the same size scaling operation, scaling amplitudes of the quadrant diagram and the scatter points in the quadrant diagram are consistent.

Specifically, in response to a size zoom-out operation of the user for the quadrant diagram, zoom out the quadrant diagram and the scatter points in the quadrant diagram in the first area. Due to a fixed size of the first area, the number of the scatter points displayed in the first area increases when the quadrant diagram and the scatter points in the quadrant diagram are zoomed out. In response to a size zoom-in operation of the user for the quadrant diagram, zoom in the quadrant diagram and the scatter points in the quadrant diagram in the first area, and the number of the scatter points displayed in the first area decreases when the quadrant diagram and the scatter points in the quadrant diagram are zoomed in.

For example, the user can perform the size zoom-out operation for the quadrant diagram through methods such as mouse scrolling, touch screen, and the like.

For example, referring to FIG. 6e, there is a scaling icon displayed in the first area. The user can perform the size zoom-out operation for the quadrant diagram by clicking on the scaling icon.

In some embodiments, when the quadrant diagram is a two-dimensional coordinate system. When determining the coordinate of the scatter point in the quadrant diagram, it is possible to determine that an abscissa of the scatter point is the indicator value of the object corresponding to the scatter point in terms of the first indicator, and an ordinate of the scatter point is the indicator value of the object corresponding to the scatter point in terms of the second indicator.

In some embodiments, when the quadrant diagram is the two-dimensional coordinate system. When determining the coordinate of the scatter point in the quadrant diagram, the indicator value of the object corresponding to the scatter point in terms of the first indicator and the indicator value of the object corresponding to the scatter point in terms of the second indicator can be normalized to obtain a normalization result of the indicator value of the object corresponding to the scatter point in terms of the first indicator and a normalization result of the indicator value of the object corresponding to the scatter point in terms of the second indicator. The abscissa of the scatter point is determined as the normalization result of the indicator value of the object corresponding to the scatter point in terms of the first indicator, and the ordinate of the scatter point is determined as the normalization result of the indicator value of the object corresponding to the scatter point in terms of the second indicator.

In some embodiments, when the quadrant diagram is the two-dimensional coordinate system, for each scatter point, it is possible to determine the abscissa of the scatter point based on indicator values of objects corresponding to respective scatter points in the sub-quadrant area where the scatter point is located in terms of the first indicator, a reference value of the first indicator and a pixel value occupied by the sub-quadrant area where the scatter point is located; and determine the ordinate of the scatter point based on the indicator values of the objects corresponding to respective scatter points in the sub-quadrant area where the scatter point is located in terms of the second indicator, the reference value of the second indicator and the pixel value occupied by the sub-quadrant area where the scatter point is located, thus improving a rationality of the coordinate of the scatter point in a pixel diagram and the display effect of the scatter point on the quadrant diagram. Where the reference value of the first indicator is a value corresponding to a reference line for the first indicator, and the reference value of the second indicator is a value corresponding to the reference line for the second indicator.

Specifically, in a process of determining the abscissa of the scatter point based on the indicator values of the objects corresponding to respective scatter points in the sub-quadrant area where the scatter point is located in terms of the first indicator, the reference value of the first indicator and the pixel value occupied by the sub-quadrant area where the scatter point is located, it is possible to determine a maximum value among the indicator values of the objects corresponding to respective scatter points in terms of the first indicator in the sub-quadrant area where the scatter point is located, and determine a coordinate of the scatter point on a coordinate axis corresponding to the first indicator based on a difference between the indicator value of the object corresponding to the scatter point in terms of the first indicator and the maximum value, as well as the difference between the maximum value and the reference value of the first indicator, that is, determine the abscissa of the scatter point.

In an embodiment, a calculation model for the coordinate dx of the scatter point p on the coordinate axis corresponding to the first indicator is:

$$dx = (x\,\mathrm{max} - xp)/(x\,\mathrm{max} - x\,\mathrm{avg})^* n,$$

where x max is the maximum value among the indicator values of the objects corresponding to respective scatter points in the sub-quadrant area where the scatter point p is located in terms of the first indicator, xp is the indicator value of the scatter point p in terms of the first indicator, x avg is the reference value of the first indicator, and n is the pixel value occupied by the sub-quadrant area where the scatter point p is located.

Specifically, in the process of determining the ordinate of the scatter point based on the indicator values of the objects corresponding to respective scatter points in the sub-quadrant area where the scatter point is located in terms of the second indicator, the reference value of the second indicator and the pixel value occupied by the sub-quadrant area where the scatter point is located, it is possible to determine the maximum value among the indicator values of the objects corresponding to respective scatter points in terms of the second indicator in the sub-quadrant area where the scatter point is located, and determine the coordinate of the scatter point on the coordinate axis corresponding to the second indicator based on a difference between the indicator value of the object corresponding to the scatter point in terms of the second indicator and the maximum value, as well as the difference between the maximum value and the reference value of the second indicator, that is, determine the ordinate of the scatter point.

In an embodiment, the calculation model for the coordinate dy of the scatter point p on the coordinate axis corresponding to the second indicator is:

$$dy = (y\,\mathrm{max} - yp)/(y\,\mathrm{max} - y\,\mathrm{avg})^* n,$$

where y max is the maximum value among the indicator values of the objects corresponding to respective scatter points in the sub-quadrant area where the scatter point p is located in terms of the second indicator, yp is the indicator value of the scatter point p in terms of the second indicator, y avg is the reference value of the second indicator, and n is the pixel value occupied by the sub-quadrant area where the scatter point p is located.

In an embodiment, when the objects are individuals in the same industry, the reference value of the first indicator can be an industry average of the first indicator, and the reference value of the second indicator can be an industry average of the second indicator, thereby improving the usefulness of the reference values of the first indicator and the second indicator.

Taking the industry as the e-commerce industry, the objects as live broadcast practitioners, then the first indicator can be an exposure rate and the second indicator can be a conversion rate, and the reference value of the first indicator is an average industry exposure rate, the reference value of the second indicator is an average industry conversion rate, where the average industry exposure rate and the average industry conversion rate can be obtained from a database. Where the conversion rate is a percentage of the number of customers who have made purchases in a store compared to the number of visitors who have arrived at the store, the indicator value of the object in terms of the exposure rate is a ratio of exposure times of proxy products by the outstanding partner(s) of merchants in the same industry and same level to the number of partners of the merchants in the same industry and same level. The merchants in the same industry and same level means that products sold by the merchants belong to the same industry, and the merchants are at the same level.

Figure 6F:
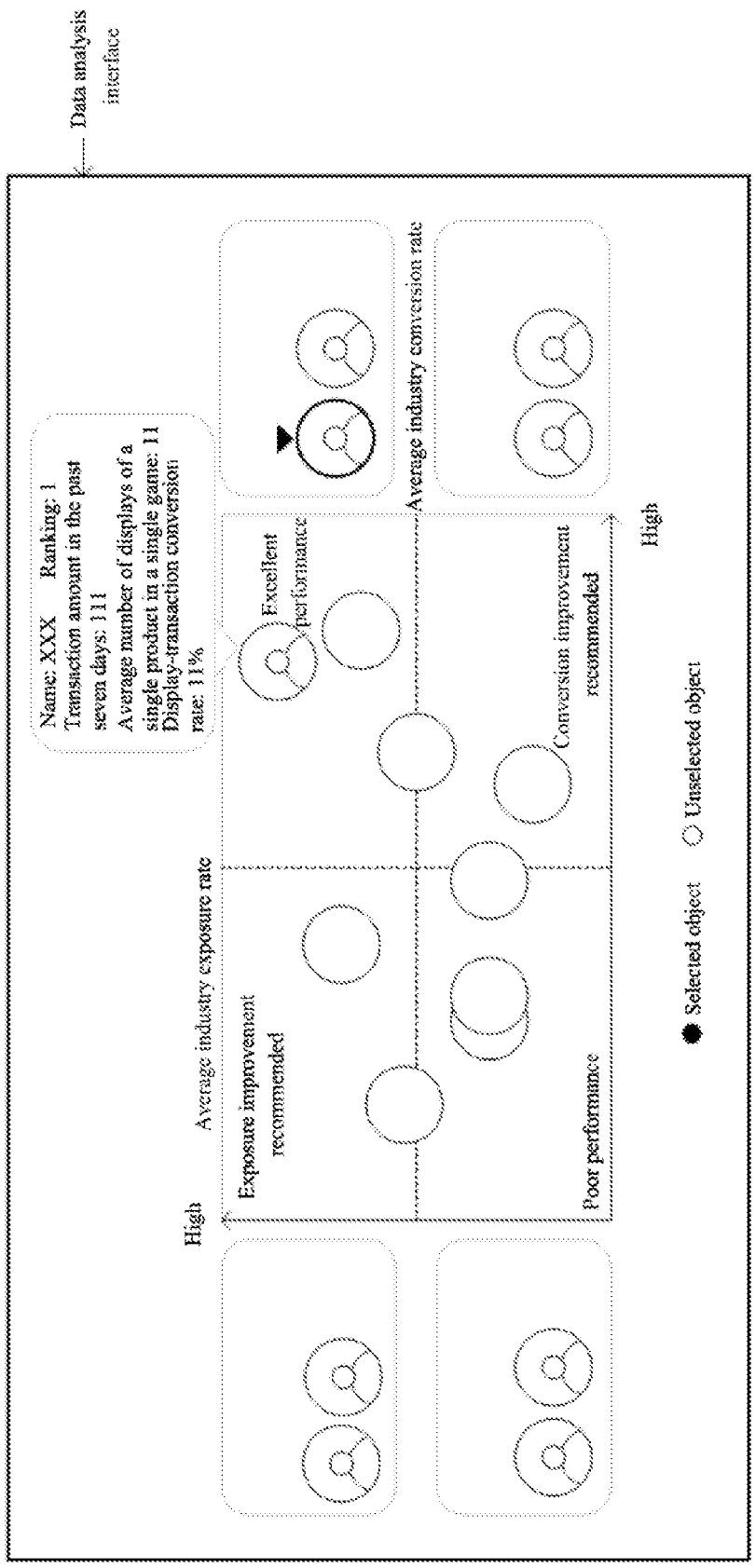
FIG. 6*f* is a schematic diagram XII of a data analysis interface provided by an embodiment of the present disclosure.

Referring to FIG. 6f, which is a schematic diagram XII of a data analysis interface provided by an embodiment of the present disclosure. In a first area, a first indicator is a exposure rate, a second indicator is a conversion rate, a reference line for the first indicator (i.e., an indicator value of the first indicator) is an average industry exposure rate, and the reference line is perpendicular to the horizontal axis; a reference line for the second indicator (i.e., an indicator value of the second indicator) is an average industry conversion rate, and the reference line is perpendicular to the vertical axis. The reference line for the first indicator and the reference line for the second indicator divide a quadrant area into four sub-quadrant areas. Based on locations of the sub-quadrant areas, performance of the objects corresponding to scatter points in the four sub-quadrant areas can be displayed on the four sub-quadrant areas, as shown in FIG. 6f. The performance includes "Poor performance", "Excellent performance", "Conversion improvement recommended", and "Exposure improvement recommended". Therefore, on the data analysis interface, a user can not only view a distribution of the objects in terms of multiple indicators at a glance, but also view the specific performance of the objects, thereby selecting and optimizing the objects based on the specific performance.

In FIG. 6f, in response to a selection operation of the user for a scatter point or in response to a selection operation of the user for an identification of an object in the second area, content displayed through a pop-up box around the scatter point selected by the user or around the scatter point corresponding to the object to which the identification selected by the user belongs includes: a name of the object, a ranking, a transaction amount in the past seven days, the average number of displays of a single product, and a display-transaction conversion rate. Where the transaction amount in the past seven days, the average number of displays of the single product and the display-transaction conversion rate belong to historical performance data of the object in terms of multiple indicators. For example, in the pop-up box corresponding to one scatter point in FIG. 6f, the name of the object corresponding to the scatter point is "XXX", the ranking is 1, the transaction amount in the past seven days is 111, the average number of displays of the single product in a single game is 11, and the display-transaction conversion rate is 11%.

Figure 7:
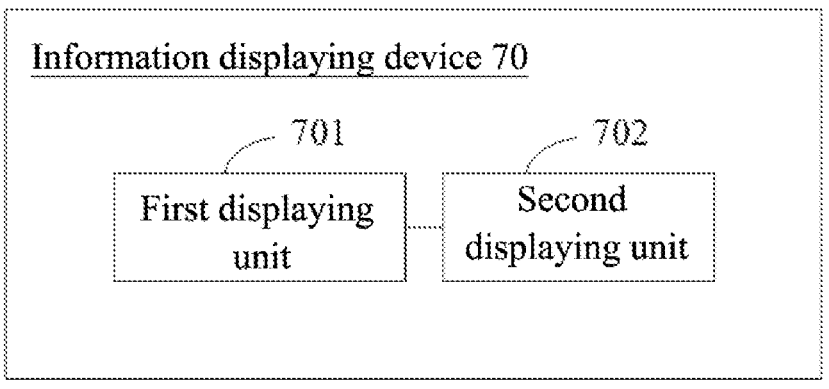
FIG. 7 is a structural block diagram of an information displaying device provided by an embodiment of the present disclosure.

Corresponding to the information displaying method of the previous embodiments, FIG. 7 is a structural block diagram of an information displaying device provided by an embodiment of the present disclosure. For ease of explanation, only parts related to the embodiment of the present disclosure are shown. Referring to FIG. 7, the information displaying device includes a first displaying unit 701 and a second displaying unit 702.

Where the first displaying unit 701 is configured to display a quadrant diagram and multiple scatter points distributed in the quadrant diagram in a first area of a data analysis interface, where different scatter points correspond to different objects, and a coordinate of a scatter point in the quadrant diagram reflects performance of an object corresponding to the scatter point in terms of multiple indicators;

the second displaying unit 702 is configured to display an identification of the object in a second area of the data analysis interface.

In an embodiment of the present disclosure, the information displaying device further includes a first selecting unit (not shown), which is configured to display multi-dimensional attribute information of an object corresponding to a scatter point selected by a user in response to a selection operation of the user for the scatter point.

In an embodiment of the present disclosure, the first selecting unit is specifically configured to distinguishably display the multi-dimensional attribute information of the object corresponding to the scatter point selected by the user in the first area in response to the selection operation of the user for the scatter point.

In an embodiment of the present disclosure, the first selecting unit is specifically configured to display historical performance data of the object corresponding to the scatter point selected by the user in terms of the multiple indicators in a surrounding area of the scatter point selected by the user.

In an embodiment of the present disclosure, the first selecting unit is further configured to display historical performance data of an object corresponding to a first target scatter point in terms of the multiple indicators in the surrounding area of the scatter point selected by the user; or, display historical performance data of an object corresponding to a first target scatter point in terms of the multiple indicators in a surrounding area of the first target scatter point, where the first target scatter point is a scatter point whose position overlaps with the scatter point selected by the user.

In an embodiment of the present disclosure, the first selecting unit is further configured to display an image of the object corresponding to the scatter point selected by the user within the scatter point selected by the user.

In an embodiment of the present disclosure, the information displaying device further includes a second selecting unit (not shown), which is configured to distinguishably display, in response to a selection operation of a user for a scatter point, an identification of an object corresponding to the scatter point selected by the user in the second area.

In an embodiment of the present disclosure, the information displaying device further includes a third selecting unit (not shown), which is configured to distinguishably display, in response to a selection operation of a user for the identification of the object, the identification of the object selected by the user in the second area.

In an embodiment of the present disclosure, the information displaying device further includes a fourth selecting unit (not shown), which is configured to distinguishably display, in response to the selection operation of the user for the identification of the object, multi-dimensional attribute information of an object corresponding to a second target scatter point in a surrounding area of the second target scatter point in the first area, where the second target scatter point is a scatter point corresponding to the identification selected by the user.

In an embodiment of the present disclosure, there are multiple second areas, and different second areas correspond to different sub-quadrant areas in the quadrant diagram. The second displaying unit 702 is specifically configured to display, in the second, area an identification of an object corresponding to a scatter point in a target sub-quadrant area, where the target sub-quadrant area is a sub-quadrant area corresponding to the second area.

In an embodiment of the present disclosure, the second displaying unit 702 is specifically configured to: if a number of scatter points in the target sub-quadrant area is greater than a preset threshold, display, in the second area, an identification of an object corresponding to a scatter point with the number of the preset threshold in the target sub-quadrant area, and the number of the scatter points in the target sub-quadrant area.

In an embodiment of the present disclosure, the information displaying device further includes a sub-page displaying unit (not shown), which is configured to display, in response to a selection operation of a user for a number of scatter points displayed in the second area, a sub-interface of the data analysis interface, and display historical performance data of objects corresponding to all scatter points in at least one sub-quadrant area in the quadrant diagram in terms of the multiple indicators on the sub-interface.

In an embodiment of the present disclosure, the sub-page displaying unit is specifically configured to display page labels corresponding to multiple sub-quadrant areas in the quadrant diagram on the sub-interface; and display, in response to a selection operation of the user for a page label, the historical performance data of the objects corresponding to all the scatter points in a corresponding sub-quadrant area in terms of the multiple indicators on the sub-interface.

In an embodiment of the present disclosure, on the data analysis interface, the second area is located on one side of the first area; or, on the data analysis interface, the second area is located around a sub-quadrant area corresponding to the second area.

In an embodiment of the present disclosure, the information displaying device further includes a searching unit (not shown), which is configured to determine, in response to an object search request of a user, a third target object among objects corresponding to all scatter points in the quadrant diagram based on a keyword input by the user; and display multi-dimensional attribute information of the third target object in the first area.

In an embodiment of the present disclosure, the information displaying device further includes a filtering unit (not shown), which is configured to: display, in response to an object filtering request of a user, a scatter point corresponding to an object whose indicator value meets an indicator filtering range in the quadrant diagram based on the indicator filtering range input by the user.

In an embodiment of the present disclosure, the information displaying device further includes a scaling unit (not shown), which is configured to scale, in response to a size scaling operation of a user for the quadrant diagram, the quadrant diagram and the scatter points in the quadrant diagram in the first area.

In an embodiment of the present disclosure, in the quadrant diagram, a size of each scatter point is related to an indicator value of an object corresponding to the each scatter point in terms of a preset indicator.

The device provided by the embodiment can be configured to execute the technical solution of foregoing method embodiments, and the implementation principles and technical effects thereof are similar, which will not be elaborate in the embodiment.

Figure 8:
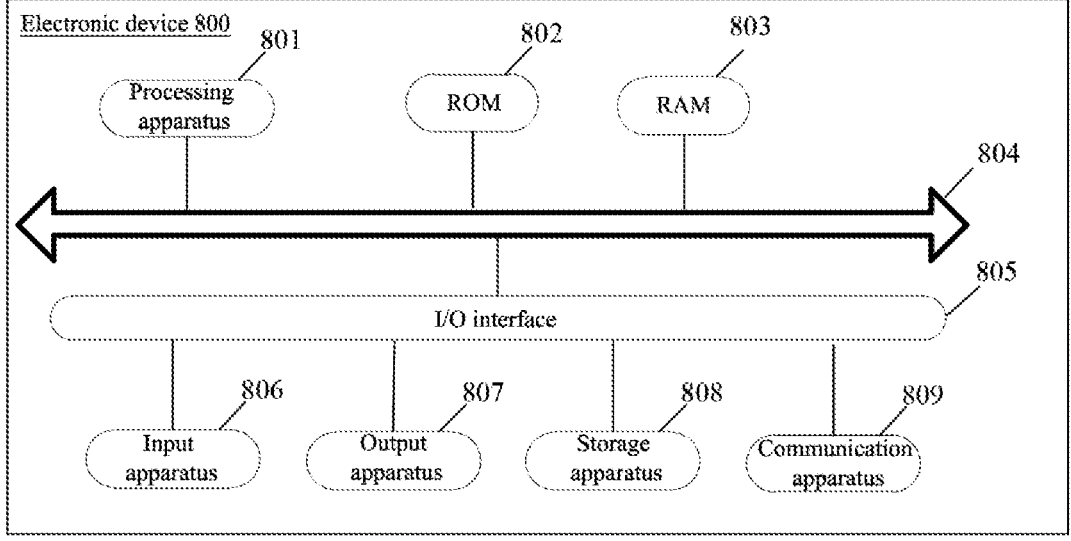
FIG. 8 is a schematic diagram of a hardware structure of an electronic device provided by an embodiment of the present disclosure.

Referring to FIG. 8, a structural schematic diagram of an electronic device 800 suitable for implementing embodiments of the present disclosure is shown, and the electronic device 800 can be a terminal device or a server. Where the terminal device can be, but is not limited to a mobile terminal such as a mobile phone, a notebook computer, a digital broadcast receiver, a personal digital assistant (PDA), a portable Android device (PAD), a portable multimedia player (PMP), an in-vehicle terminal (such as in-vehicle navigation terminals) and the like, and a stationary terminal such as a digital TV, a desktop computer and the like. The electronic device shown in FIG. 8 is only an example and should not impose any limitations on functions and usable scopes of the embodiments of the present disclosure.

As shown in FIG. 8, the electronic device 800 can include a processing apparatus (for example, a central processing unit, a graphics processor and the like) 801, which may execute various appropriate actions and processes based on a program stored in a read-only memory (ROM) 802 or a program loaded into a random access memory (RAM) 803 from a storage apparatus 808. In the RAM 803, various programs and data necessary for operations of the electronic device 800 are also stored. The processing apparatus 801, the ROM 802 and the RAM 803 are connected to each other through a bus 804. An input/output (I/O) interface 805 is also connected to the bus 804.

Typically, the following apparatus can be connected to the I/O interface 805: an input apparatus 806 including, for example, a touch screen, a touchpad, a keyboard, a mouse, a camera, a microphone, an accelerometer, a gyroscope and the like; an output apparatus 807 including, for example, a liquid crystal display (LCD), a speaker, a vibrator and the like; a storage apparatus 808, including, for example, a magnetic tape, a hard disk and the like; and a communication apparatus 809. The communication apparatus 809 may allow the electronic device 800 to communicate wirelessly or through wires with other devices to exchange data. While FIG. 8 shows the electronic device 800 having various apparatus, it should be understood that not all of the illustrated apparatus are required to be implemented or provided. More or fewer apparatus may alternatively be implemented or provided.

In particular, according to the embodiments of the present disclosure, the processes described above with reference to the flowcharts may be implemented as computer software programs. For example, an embodiment of the present disclosure includes a computer program product, which includes a computer program carried on a computer-readable medium, the computer program contains program codes for performing the method illustrated in the flowchart. In such an embodiment, the computer program may be downloaded and installed from the network via the communication apparatus 809, or installed from the storage apparatus 809, or installed from the ROM 802. When the computer program is executed by the processing apparatus 801, the above functions defined in the method of the embodiment of the present disclosure are executed.

It should be noted that, the computer-readable medium described in the embodiments of the present disclosure may be a computer-readable signal medium or a computer-readable storage medium, or any combination of the above two. The computer-readable storage medium can be, for example, but not limited to, an electrical, magnetic, optical, electromagnetic, infrared or semiconductor system, apparatus or device, or the combination of any of the above. an electrical connection having one or more leads, a portable computer diskette, a hard disk, a random access memory (RAM), a read only memory (ROM), an erasable programmable read only memory (EPROM or flash memory), an optical fiber, a portable compact disc read only memory (CD-ROM), an optical storage apparatus, a magnetic storage apparatus, or any suitable combination thereof. In the present disclosure, the computer-readable storage medium may be any tangible medium that can contain or store a program. The program can be used by or in connection with an instruction execution system, apparatus, or component. While in the present disclosure, the computer-readable signal medium may include a data signal in baseband or propagated as part of a carrier wave, which carries computer-readable program codes. Such propagated data signal may take a variety of forms, including but not limited to an electromagnetic signal, an optical signal or any suitable combination of the above. The computer-readable signal medium can also be any computer-readable medium other than the computer-readable storage medium, and the computer-readable signal medium can transmit, propagate or transport the program for use by or in conjunction with the instruction execution system, apparatus or device. The program code contained on the computer-readable medium may be transmitted by any suitable medium, including but not limited to: an electric wire, an optical fiber cable, a radio frequency (RF) and the like, or any suitable combination of the above.

The computer readable medium mentioned above can be included in the electronic device mentioned above; or it can also exist separately without being assembled into the electronic device.

The computer readable medium mentioned above carries one or more programs, when the one or more programs executed by the electronic device, the electronic device is caused to execute the method shown in the above embodiment.

Computer program codes for performing the operations of the embodiments of the present disclosure may be written in one or more programming languages, the programming languages include object-oriented programming languages-such as Java, Smalltalk, C++, and also include conventional procedural programming languages-such as the "C" language or similar programming languages. The program code may be executed entirely on a user's computer, partly on the user's computer, as a stand-alone software package, partly on the user's computer and partly on a remote computer, or entirely on the remote computer or a server. In a case where the remote computer is involved, the remote computer may be connected to the user's computer through any kind of networks, including a local area network (LAN) or a wide area network (WAN), or may be connected to an external computer (for example, connected via the Internet through an Internet service provider).

Flowcharts and block diagrams in the accompanying drawings illustrate an architecture, a functionality and an operation of possible implementations of systems, methods and computer program products according to various embodiments of the present disclosure. In this regard, each block in the flowchart or block diagrams may represent a module, a code segment or a part of the code, the module, code segment or part of the code contains one or more executable instructions used to implement specified logical functions. It should also be noted that, in some alternative implementations, the functions noted in the blocks may occur in an order different from those noted in the accompanying drawings. For example, two blocks shown in succession may, in fact, be executed substantially concurrently, or sometimes be executed in a reverse order, depending upon the functionality involved. It should also be noted that, each block of the block diagrams and/or flowcharts, and combinations of blocks in the block diagrams and/or flowcharts can be implemented in dedicated hardware-based systems that perform the specified functions or operations, or can be implemented in a combination of dedicated hardware and computer instructions.

Units involved in the embodiments of the present disclosure may be implemented in a software manner, and may also be implemented in a hardware manner. Where, the name of the unit does not constitute a limitation for the unit per se under certain circumstances. For example, a first acquisition unit can also be described as "a unit for obtaining at least two Internet protocol addresses".

The functions described above herein can be at least partially executed by one or more hardware logic components. For example, non-limitation available examples of the hardware logic components include: a field programmable gate array (FPGA), an application specific integrated circuit (ASIC), an application specific standard part (ASSP), a system on chip (SOC), a complex programmable logic device (CPLD) and the like.

In the context of this disclosure, a machine readable medium can be a tangible medium that can contain or store programs for use by or in combination with instruction execution systems, apparatus, or devices. The machine readable medium can be a machine readable signal medium or a machine readable storage medium. The machine readable medium may include but are not limited to an electronic, magnetic, optical, electromagnetic, infrared or semiconductor system, apparatus or device, or any suitable combination of the above. More specific examples of the machine readable storage medium may include an electrical connection based on one or more wires, a portable computer disk, a hard drive, a random access memory (RAM), a read-only memory (ROM), an erasable programmable read-only memory (EPROM or flash memory), an optical fiber, a compact disc read-only memory (CD-ROM), an optical storage device, a magnetic storage device, or any suitable combination of the above.

In a first aspect, based on one or more embodiments of the present disclosure, an information displaying method is provided, including: displaying a quadrant diagram and multiple scatter points distributed in the quadrant diagram in a first area of a data analysis interface, where different scatter points correspond to different objects, and a coordinate of a scatter point in the quadrant diagram reflects performance of an object corresponding to the scatter point in terms of multiple indicators; and displaying an identification of the object in a second area of the data analysis interface.

Based on one or more embodiments of the present disclosure, the information displaying method further includes: displaying multi-dimensional attribute information of an object corresponding to a scatter point selected by a user in response to a selection operation of the user for the scatter point.

Based on one or more embodiments of the present disclosure, the displaying the multi-dimensional attribute information of the object corresponding to the scatter point selected by the user in response to the selection operation of the user for the scatter point, includes: distinguishably displaying the multi-dimensional attribute information of the object corresponding to the scatter point selected by the user in the first area in response to the selection operation of the user for the scatter point.

Based on one or more embodiments of the present disclosure, the distinguishably displaying the multi-dimensional attribute information of the object corresponding to the scatter point selected by the user in the first area, includes: displaying historical performance data of the object corresponding to the scatter point selected by the user in terms of the multiple indicators in a surrounding area of the scatter point selected by the user.

Based on one or more embodiments of the present disclosure, the distinguishably displaying the multi-dimensional attribute information of the object corresponding to the scatter point selected by the user in the first area, further includes: displaying historical performance data of an object corresponding to a first target scatter point in terms of the multiple indicators in the surrounding area of the scatter point selected by the user; or, displaying historical performance data of an object corresponding to a first target scatter point in terms of the multiple indicators in a surrounding area of the first target scatter point; where the first target scatter point is a scatter point whose position overlaps with the scatter point selected by the user.

Based on one or more embodiments of the present disclosure, the distinguishably displaying the multi-dimensional attribute information of the object corresponding to the scatter point selected by the user in the first area, further includes: displaying an image of the object corresponding to the scatter point selected by the user within the scatter point selected by the user.

Based on one or more embodiments of the present disclosure, the information displaying method further includes: in response to a selection operation of a user for a scatter point, distinguishably displaying an identification of an object corresponding to the scatter point selected by the user in the second area.

Based on one or more embodiments of the present disclosure, the information displaying method further includes: in response to a selection operation of a user for the identification of the object, distinguishably displaying the identification of the object selected by the user in the second area.

Based on one or more embodiments of the present disclosure, after displaying the quadrant diagram and the multiple scatter points distributed in the quadrant diagram in the first area of the data analysis interface, the information displaying method further includes: in response to the selection operation of the user for the identification of the object, distinguishably displaying multi-dimensional attribute information of an object corresponding to a second target scatter point in a surrounding area of the second target scatter point in the first area, where the second target scatter point is a scatter point corresponding to the identification selected by the user.

Based on one or more embodiments of the present disclosure, there are multiple second areas, and different second areas correspond to different sub-quadrant areas in the quadrant diagram, and the displaying the identification of the object in the second area of the data analysis interface, includes: displaying, in the second area, an identification of an object corresponding to a scatter point in a target sub-quadrant area, where the target sub-quadrant area is a sub-quadrant area corresponding to the second area.

Based on one or more embodiments of the present disclosure, the displaying, in the second area, the identification of the object corresponding to the scatter point in the target sub-quadrant area, includes: if a number of scatter points in the target sub-quadrant area is greater than a preset threshold, then displaying, in the second area, an identification of an object corresponding to a scatter point with the number of the preset threshold in the target sub-quadrant area, and the number of the scatter points in the target sub-quadrant area.

Based on one or more embodiments of the present disclosure, after displaying the identification of the object corresponding to the scatter point with the number of the preset threshold in the target sub-quadrant area, and the number of the scatter points in the target sub-quadrant area, the information displaying method further includes: in response to a selection operation of a user for a number of scatter points displayed in the second area, displaying a sub-interface of the data analysis interface; displaying historical performance data of objects corresponding to all scatter points in at least one sub-quadrant area in the quadrant diagram in terms of the multiple indicators on the sub-interface.

Based on one or more embodiments of the present disclosure, the displaying the historical performance data of the objects corresponding to all the scatter points in the at least one sub-quadrant area in the quadrant diagram in terms of the multiple indicators on the sub-interface, includes: displaying page labels corresponding to multiple sub-quadrant areas in the quadrant diagram on the sub-interface; and in response to a selection operation of the user for a page label, displaying the historical performance data of the objects corresponding to all the scatter points in a corresponding sub-quadrant area in terms of the multiple indicators on the sub-interface.

Based on one or more embodiments of the present disclosure, on the data analysis interface, the second area is located on one side of the first area; or, on the data analysis interface, the second area is located around a sub-quadrant area corresponding to the second area.

Based on one or more embodiments of the present disclosure, after displaying the quadrant diagram and the multiple scatter points distributed in the quadrant diagram in the first area of the data analysis interface, the information displaying method further includes: in response to an object search request of a user, determining a third target object among objects corresponding to all scatter points in the quadrant diagram based on a keyword input by the user; and displaying multi-dimensional attribute information of the third target object in the first area.

Based on one or more embodiments of the present disclosure, after displaying the quadrant diagram and the multiple scatter points distributed in the quadrant diagram in the first area of the data analysis interface, the information displaying method further includes: in response to an object filtering request of a user, displaying a scatter point corresponding to an object whose indicator value meets an indicator filtering range in the quadrant diagram based on the indicator filtering range input by the user.

Based on one or more embodiments of the present disclosure, after displaying the quadrant diagram and the multiple scatter points distributed in the quadrant diagram in the first area of the data analysis interface, the information displaying method further includes: in response to a size scaling operation of a user for the quadrant diagram, scaling the quadrant diagram and the scatter points in the quadrant diagram in the first area.

Based on one or more embodiments of the present disclosure, in the quadrant diagram, a size of each scatter point is related to an indicator value of an object corresponding to the each scatter point in terms of a preset indicator.

In a second aspect, based on one or more embodiments of the present disclosure, an information displaying device is provided, including:

a first displaying unit, configured to display a quadrant diagram and multiple scatter points distributed in the quadrant diagram in a first area of a data analysis interface, where different scatter points correspond to different objects, and a coordinate of a scatter point in the quadrant diagram reflects performance of an object corresponding to the scatter point in terms of multiple indicators; and a second displaying unit, configured to display an identification of the object in a second area of the data analysis interface.

Based on one or more embodiments of the present disclosure, the information displaying device further includes: a first selecting unit, configured to display multi-dimensional attribute information of an object corresponding to a scatter point selected by a user in response to a selection operation of the user for the scatter point.

Based on one or more embodiments of the present disclosure, the first selecting unit is specifically configured to distinguishably display the multi-dimensional attribute information of the object corresponding to the scatter point selected by the user in the first area in response to the selection operation of the user for the scatter point.

Based on one or more embodiments of the present disclosure, the first selecting unit is specifically configured to display historical performance data of the object corresponding to the scatter point selected by the user in terms of the multiple indicators in a surrounding area of the scatter point selected by the user.

Based on one or more embodiments of the present disclosure, the first selecting unit is further configured to display historical performance data of an object corresponding to a first target scatter point in terms of the multiple indicators in the surrounding area of the scatter point selected by the user; or, display historical performance data of an object corresponding to a first target scatter point in terms of the multiple indicators in a surrounding area of the first target scatter point, where the first target scatter point is a scatter point whose position overlaps with the scatter point selected by the user.

Based on one or more embodiments of the present disclosure, the first selecting unit is further configured to display an image of the object corresponding to the scatter point selected by the user within the scatter point selected by the user.

Based on one or more embodiments of the present disclosure, the information displaying device further includes a second selecting unit, configured to distinguishably display, in response to a selection operation of a user for a scatter point, an identification of an object corresponding to the scatter point selected by the user.

Based on one or more embodiments of the present disclosure, the information displaying device further includes a third selecting unit, configured to distinguishably display, in response to a selection operation of a user for the identification of the object, the identification of the object selected by the user in the second area.

Based on one or more embodiments of the present disclosure, the information displaying device further includes a fourth selecting unit, configured to distinguishably display, in response to the selection operation of the user for the identification of the object, multi-dimensional attribute information of an object corresponding to a second target scatter point in a surrounding area of the second target scatter point in the first area, where the second target scatter point is a scatter point corresponding to the identification selected by the user.

Based on one or more embodiments of the present disclosure, there are multiple second areas, and different second areas correspond to different sub-quadrant areas in the quadrant diagram; the second displaying unit is specifically configured to display, in the second area, an identification of an object corresponding to a scatter point in a target sub-quadrant area, where the target sub-quadrant area is a sub-quadrant area corresponding to the second area.

Based on one or more embodiments of the present disclosure, the second displaying unit is specifically configured to: if a number of scatter points in the target sub-quadrant area is greater than a preset threshold, display, in the second area, an identification of an object corresponding to a scatter point with the number of the preset threshold in the target sub-quadrant area, and the number of the scatter points in the target sub-quadrant area.

Based on one or more embodiments of the present disclosure, the information displaying device further includes a sub-page displaying unit, configured to display, in response to a selection operation of a user for a number of scatter points displayed in the second area, a sub-interface of the data analysis interface, and display historical performance data of objects corresponding to all scatter points in at least one sub-quadrant area in the quadrant diagram in terms of the multiple indicators on the sub-interface.

Based on one or more embodiments of the present disclosure, the sub-page displaying unit is specifically configured to display page labels corresponding to multiple sub-quadrant areas in the quadrant diagram on the sub-interface; and display, in response to a selection operation of the user for a page label, the historical performance data of the objects corresponding to all the scatter points in a corresponding sub-quadrant area in terms of the multiple indicators on the sub-interface.

Based on one or more embodiments of the present disclosure, on the data analysis interface, the second area is located on one side of the first area; or, on the data analysis interface, the second area is located around a sub-quadrant area corresponding to the second area.

Based on one or more embodiments of the present disclosure, the information displaying device further includes a searching unit, configured to determine, in response to an object search request of a user, a third target object among objects corresponding to all scatter points in the quadrant diagram based on a keyword input by the user; and display multi-dimensional attribute information of the third target object in the first area.

Based on one or more embodiments of the present disclosure, the information displaying device further includes a filtering unit, configured to display, in response to an object filtering request of a user, a scatter point corresponding to an object whose indicator value meets an indicator filtering range in the quadrant diagram based on the indicator filtering range input by the user.

Based on one or more embodiments of the present disclosure, the information displaying device further includes a scaling unit, which is configured to scale, in response to a size scaling operation of a user for the quadrant diagram, the quadrant diagram and the scatter points in the quadrant diagram in the first area.

Based on one or more embodiments of the present disclosure, in the quadrant diagram, a size of each scatter point is related to an indicator value of an object corresponding to the each scatter point in terms of a preset indicator.

In a third aspect, based on one or more embodiments of the present disclosure, an electronic device is provided, including: at least one processor and a memory;

the memory stores computer execution instructions;

the at least one processor executes the computer execution instructions stored in the memory, enabling the at least one processor to execute the information displaying method according to the first aspect and various possible designs of the first aspect.

In a fourth aspect, based on one or more embodiments of the present disclosure, a computer readable storage medium is provided, where the computer readable storage medium stores computer execution instructions, and when the computer execution instructions are executed by a processor, the information displaying method according to the first aspect and various possible designs of the first aspect is implemented.

In a fifth aspect, based on one or more embodiments of the present disclosure, a computer program product is provided, including a computer program, where when the computer program is executed by a processor, the information displaying method according to the first aspect and various possible designs of the first aspect is implemented.

In a sixth aspect, based on one or more embodiments of the present disclosure, a computer program is provided, where when the computer program is executed by a processor, the information displaying method according to the first aspect and various possible designs of the first aspect is implemented.

The above is only a description of preferred embodiments of the present disclosure and an illustration of applied technical principles. Those skilled in the art should understand that, a disclosure scope involved in the present disclosure is not limited to technical solutions formed by specific combinations of technical features, and should also cover other technical solutions formed by any combination of the above technical features or their equivalent features without departing from a concept of the present disclosure. For example, the technical solution formed by replacing the above features with the technical features with similar functions as those disclosed in the present disclosure (but not limited thereto).

Furthermore, although each operation is depicted in a specific order, this should not be understood as requiring these operations to be executed in the specific order shown or in a sequential order. In certain environments, multitasking and parallel processing may be advantageous. Similarly, although several specific implementation details are included in the above discussion, these should not be interpreted as limiting a scope of the present disclosure. Some features described in the context of an individual embodiment can also be combined and implemented in the individual embodiment. On the contrary, various features described in the context of the individual embodiment can also be implemented separately or in any suitable sub combination in multiple embodiments.

Although a subject matter has been described in language specific to structural features and/or method logical actions, it should be understood that the subject matter limited in the attached claims may not necessarily be limited to the specific features or actions described above. On the contrary, the specific features and actions described above are only exemplary forms for implementing the claims.

What is claimed is:

1. An information displaying method, comprising:
   displaying a quadrant diagram and multiple scatter points distributed in the quadrant diagram in a first area of a data analysis interface, wherein different scatter points correspond to different objects, and a coordinate of a scatter point in the quadrant diagram reflects performance of an object corresponding to the scatter point in terms of multiple indicators; and
   displaying an identification of the object in a second area of the data analysis interface;
   wherein there are multiple second areas, different second areas correspond to different sub-quadrant areas in the quadrant diagram, and the displaying the identification of the object in the second area of the data analysis interface, comprises:
   displaying, in the second area, an identification of an object corresponding to a scatter point in a target sub-quadrant area, wherein the target sub-quadrant area is a sub-quadrant area corresponding to the second area.

2. The information displaying method according to claim 1, wherein the information displaying method further comprises:
   displaying multi-dimensional attribute information of an object corresponding to a scatter point selected by a user in response to a selection operation of the user for the scatter point.

3. The information displaying method according to claim 2, wherein displaying the multi-dimensional attribute information of the object corresponding to the scatter point selected by the user in response to the selection operation of the user for the scatter point, comprises:
   distinguishably displaying the multi-dimensional attribute information of the object corresponding to the scatter point selected by the user in the first area in response to the selection operation of the user for the scatter point.

4. The information displaying method according to claim 3, wherein distinguishably displaying the multi-dimensional attribute information of the object corresponding to the scatter point selected by the user in the first area, comprises:
   displaying historical performance data of the object corresponding to the scatter point selected by the user in terms of the multiple indicators in a surrounding area of the scatter point selected by the user.

5. The information displaying method according to claim 4, wherein distinguishably displaying the multi-dimensional attribute information of the object corresponding to the scatter point selected by the user in the first area, further comprises:
   displaying historical performance data of an object corresponding to a first target scatter point in terms of the multiple indicators in the surrounding area of the scatter point selected by the user; or,
   displaying historical performance data of an object corresponding to a first target scatter point in terms of the multiple indicators in a surrounding area of the first target scatter point;
   wherein the first target scatter point is a scatter point whose position overlaps with the scatter point selected by the user.

6. The information displaying method according to claim 4, wherein distinguishably displaying the multi-dimensional attribute information of the object corresponding to the scatter point selected by the user in the first area, further comprises:
   displaying an image of the object corresponding to the scatter point selected by the user within the scatter point selected by the user.

7. The information displaying method according to claim 1, wherein the information displaying method further comprises:
   in response to a selection operation of a user for a scatter point, distinguishably displaying an identification of an object corresponding to the scatter point selected by the user in the second area.

8. The information displaying method according to claim 1, wherein the information displaying method further comprises:
   in response to a selection operation of a user for the identification of the object, distinguishably displaying the identification of the object selected by the user in the second area.

9. The information displaying method according to claim 8, wherein after displaying the quadrant diagram and the multiple scatter points distributed in the quadrant diagram in the first area of the data analysis interface, the information displaying method further comprises:
   in response to the selection operation of the user for the identification of the object, distinguishably displaying multi-dimensional attribute information of an object corresponding to a second target scatter point in a surrounding area of the second target scatter point in the first area, wherein the second target scatter point is a scatter point corresponding to the identification selected by the user.

10. The information displaying method according to claim 1, wherein displaying, in the second area, the identification of the object corresponding to the scatter point in the target sub-quadrant area, comprises:
   if a number of scatter points in the target sub-quadrant area is greater than a preset threshold, then displaying, in the second area, an identification of an object corresponding to a scatter point with the number of the preset threshold in the target sub-quadrant area, and the number of the scatter points in the target sub-quadrant area.

11. The information displaying method according to claim 10, wherein after displaying the identification of the object corresponding to the scatter point with the number of the preset threshold in the target sub-quadrant area, and the number of scatter points in the target sub-quadrant area, the information displaying method further comprises:

in response to a selection operation of a user for a number of scatter points displayed in the second area, displaying a sub-interface of the data analysis interface; and displaying historical performance data of objects corresponding to all scatter points in at least one sub-quadrant area in the quadrant diagram in terms of the multiple indicators on the sub-interface.

12. The information displaying method according to claim 11, wherein displaying the historical performance data of the objects corresponding to all the scatter points in the at least one sub-quadrant area in the quadrant diagram in terms of the multiple indicators on the sub-interface, comprises:

displaying page labels corresponding to multiple sub-quadrant areas in the quadrant diagram on the sub-interface; and in response to a selection operation of the user for a page label, displaying the historical performance data of the objects corresponding to all the scatter points in a corresponding sub-quadrant area in terms of the multiple indicators on the sub-interface.

13. The information displaying method according to claim 1, wherein on the data analysis interface, the second area is located on one side of the first area; or, on the data analysis interface, the second area is located around a sub-quadrant area corresponding to the second area.

14. The information displaying method according to claim 1, wherein after displaying the quadrant diagram and the multiple scatter points distributed in the quadrant diagram in the first area of the data analysis interface, the information displaying method further comprises:

in response to an object search request of a user, determining a third target object among objects corresponding to all scatter points in the quadrant diagram based on a keyword input by the user; and displaying multi-dimensional attribute information of the third target object in the first area.

15. The information displaying method according to claim 1, wherein after displaying the quadrant diagram and the multiple scatter points distributed in the quadrant diagram in the first area of the data analysis interface, the information displaying method further comprises:

in response to an object filtering request of a user, displaying a scatter point corresponding to an object whose indicator value meets an indicator filtering range in the quadrant diagram based on the indicator filtering range input by the user.

16. The information displaying method according to claim 1, wherein after displaying the quadrant diagram and the multiple scatter points distributed in the quadrant diagram in the first area of the data analysis interface, the information displaying method further comprises:

in response to a size scaling operation of a user for the quadrant diagram, scaling the quadrant diagram and the scatter points in the quadrant diagram in the first area.

17. The information displaying method according to claim 1, wherein in the quadrant diagram, a size of each scatter point is related to an indicator value of an object corresponding to the each scatter point in terms of a preset indicator.

18. An information displaying device, comprising:

at least one processor and a memory;

wherein the memory stores computer execution instructions;

the at least one processor executes the computer execution instructions stored in the memory, enabling the at least one processor to:

display a quadrant diagram and multiple scatter points distributed in the quadrant diagram in a first area of a data analysis interface, wherein different scatter points correspond to different objects, and a coordinate of a scatter point in the quadrant diagram reflects performance of an object corresponding to the scatter point in terms of multiple indicators; and display an identification of the object in a second area of the data analysis interface;

wherein there are multiple second areas, and different second areas correspond to different sub-quadrant areas in the quadrant diagram, the at least one processor executes the computer execution instructions stored in the memory, enabling the at least one processor to:

display, in the second area, an identification of an object corresponding to a scatter point in a target sub-quadrant area, wherein the target sub-quadrant area is a sub-quadrant area corresponding to the second area.

19. A non-transitory computer-readable storage medium, wherein the computer-readable storage medium stores computer execution instructions; and when a processor executes the computer execution instructions, the processor is enabled to:

display a quadrant diagram and multiple scatter points distributed in the quadrant diagram in a first area of a data analysis interface, wherein different scatter points correspond to different objects, and a coordinate of a scatter point in the quadrant diagram reflects performance of an object corresponding to the scatter point in terms of multiple indicators; and display an identification of the object in a second area of the data analysis interface;

wherein there are multiple second areas, and different second areas correspond to different sub-quadrant areas in the quadrant diagram, the processor is enabled to:

display, in the second area, an identification of an object corresponding to a scatter point in a target sub-quadrant area, wherein the target sub-quadrant area is a sub-quadrant area corresponding to the second area.

* * * * *